US012266786B2

(12) United States Patent
Liao et al.

(10) Patent No.: US 12,266,786 B2
(45) Date of Patent: Apr. 1, 2025

(54) NEGATIVE ELECTRODE, AND ELECTROCHEMICAL APPARATUS AND ELECTRONIC APPARATUS INCLUDING SAME

(71) Applicant: Ningde Amperex Technology Limited, Fujian (CN)

(72) Inventors: Qunchao Liao, Ningde (CN); Hang Cui, Ningde (CN); Yuansen Xie, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 743 days.

(21) Appl. No.: 17/460,736

(22) Filed: Aug. 30, 2021

(65) Prior Publication Data

US 2021/0391567 A1    Dec. 16, 2021

Related U.S. Application Data

(63) Continuation of application No. PCT/CN2019/121735, filed on Nov. 28, 2019.

(51) Int. Cl.
| | | |
|---|---|---|
| *H01M 4/36* | (2006.01) | |
| *H01M 4/02* | (2006.01) | |
| *H01M 4/38* | (2006.01) | |
| *H01M 4/48* | (2010.01) | |
| *H01M 4/587* | (2010.01) | |
| *H01M 10/0525* | (2010.01) | |

(52) U.S. Cl.
CPC ........... *H01M 4/364* (2013.01); *H01M 4/366* (2013.01); *H01M 4/386* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 2007/0178386 A1* | 8/2007 | Takeda | H01M 10/0569 |
| | | | 252/364 |
| 2015/0024283 A1* | 1/2015 | Deguchi | H01M 4/502 |
| | | | 429/332 |
| 2019/0148762 A1* | 5/2019 | Torita | H01M 10/0525 |
| | | | 429/209 |
| 2019/0280290 A2 | 9/2019 | Azami | |
| 2022/0052327 A1* | 2/2022 | Jiang | H01M 4/366 |

FOREIGN PATENT DOCUMENTS

| CN | 101504980 A | 8/2009 |
|---|---|---|
| CN | 101919090 A | 12/2010 |
| CN | 102509778 A | 6/2012 |
| CN | 102651476 A | 8/2012 |
| CN | 103560233 A | 2/2014 |
| CN | 103560234 A | 2/2014 |
| CN | 103633306 A | 3/2014 |
| CN | 104813518 A | 7/2015 |
| CN | 105229828 A | 1/2016 |
| CN | 105453314 A | 3/2016 |
| CN | 105552373 A * | 5/2016 |
| CN | 106532019 A | 3/2017 |
| CN | 107710467 A | 2/2018 |
| CN | 107851776 A | 3/2018 |
| CN | 108023072 A | 5/2018 |
| CN | 108075117 A | 5/2018 |
| CN | 109301184 A | 2/2019 |
| CN | 109417163 A | 3/2019 |
| CN | 109638254 A | 4/2019 |
| CN | 109638354 A | 4/2019 |
| CN | 109841823 A | 6/2019 |
| CN | 110010861 A | 7/2019 |
| CN | 110121800 A | 8/2019 |
| JP | 2006190642 A | 7/2006 |
| JP | 2013101920 A | 5/2013 |
| JP | 2013229347 A | 11/2013 |
| JP | 201526579 A | 2/2015 |
| JP | 2015503836 A | 2/2015 |
| JP | 2016509339 A | 3/2016 |
| JP | 2016103337 A | 6/2016 |
| JP | 2017054660 A | 3/2017 |
| JP | 6127817 B2 | 5/2017 |
| JP | 2018041702 A * | 3/2018 |
| JP | 2019029311 A | 2/2019 |
| JP | 201991630 A | 6/2019 |

(Continued)

OTHER PUBLICATIONS

Machine translation of CN 109301184, published on Feb. 1, 2019 (Year: 2019).*
Machine translation of JP2018-041702, published on Mar. 15, 2018 (Year: 2018).*
Machine translation of WO2011/027503, published on Mar. 10, 2011 (Year: 2011).*
Machine translation of CN 105552373 A, published on May 4, 2016 (Year: 2016).*
Examination Report issued on Aug. 7, 2022, in corresponding Indian Application No. 202117017749, 5 pages.
Office Action issued on Apr. 19, 2022, in corresponding Japanese Application No. 2021-512581, 11 pages.
Decision to Grant a Patent issued on Oct. 25, 2022, in corresponding Japanese Application No. 2021-512581, 4 pages.
Office Action issued on Aug. 16, 2023, in corresponding Korean Application No. 10-2021-7009536, 15 pages.
Extended European Search Report issued on Sep. 14, 2022, in corresponding European Application No. 19954470.1, 9 pages.

(Continued)

*Primary Examiner* — Anca Eoff
(74) *Attorney, Agent, or Firm* — Maier & Maier, PLLC

(57) ABSTRACT

A negative electrode includes silicon-based particles and graphite particles, where a quantity of graphite particles present within a vertical distance of about 0 to 6 μm to respective edges of the silicon-based particles is N, and based on a total quantity of the silicon-based particles, more than about 50% of the silicon-based particles satisfy: 6≤N≤17. The negative electrode has good cycle performance, and a battery prepared by using the negative electrode has good rate performance and a low deformation rate.

30 Claims, 6 Drawing Sheets

(56) References Cited

FOREIGN PATENT DOCUMENTS

| | | | |
|---|---|---|---|
| JP | 2019133920 A | 8/2019 | |
| KR | 1020090045114 A | 5/2009 | |
| KR | 1020190018680 A | 2/2019 | |
| WO | WO-2011027503 A1 * | 3/2011 | ........ H01M 10/0525 |
| WO | WO-2013149807 A2 * | 10/2013 | ............ C01B 32/21 |
| WO | 2016035274 A1 | 3/2016 | |
| WO | 2016121585 A1 | 8/2016 | |
| WO | 2017057769 A1 | 4/2017 | |
| WO | 2018179813 A1 | 10/2018 | |
| WO | 2019107242 A1 | 6/2019 | |
| WO | 2019220576 A1 | 11/2019 | |

OTHER PUBLICATIONS

International Search Report and Written Opinion issued on Aug. 28, 2020 in corresponding Chinese Application No. PCT/CN2019/121735; 13 pages.
Chinese Office Action issued on Jul. 29, 2020 in corresponding Chinese Application No. 201911193195.5; 28 pages.
Chinese Office Action issued on Oct. 16, 2020 in corresponding Chinese Application No. 201911193195.5; 7 pages.

\* cited by examiner

NEGATIVE ELECTRODE, AND ELECTROCHEMICAL APPARATUS AND ELECTRONIC APPARATUS INCLUDING SAME

CROSS-REFERENCE TO THE RELATED APPLICATIONS

This present application is a continuation patent application of PCT application PCT/CN2019/121735, filed on Nov. 28, 2019, the disclosure of which is hereby incorporated by reference in its entirety.

FIELD

This application relates to the field of energy storage, and in particular, to a negative electrode, and an electrochemical apparatus and an electronic apparatus including the same, especially a lithium-ion battery.

BACKGROUND

As consumer electronic products such as notebook computers, mobile phones, tablet computers, mobile power supplies and drones are popularized, requirements for electrochemical devices have become more and more stringent. For example, batteries are required to not only be light but also have high capacity and long service life. Lithium-ion batteries have occupied the mainstream position in the market due to outstanding advantages such as high energy density, high safety, no memory effect and long service life.

SUMMARY

In embodiments of this application, a negative electrode is provided to resolve at least one problem in the related art to at least some extent. In the embodiments of this application, an electrochemical apparatus and an electronic apparatus using the negative electrode are also provided.

In an embodiment, this application provides a negative electrode which includes silicon-based particles and graphite particles, where a quantity of graphite particles present within a vertical distance of about 0 to 6 µm to respective edges of the silicon-based particles is N, and based on a total quantity of the silicon-based particles, more than about 50% of the silicon-based particles satisfy: 6≤N≤17.

In another embodiment, this application provides an electrochemical apparatus which includes the negative electrode according to the embodiments of this application.

In another embodiment, this application provides an electronic apparatus which includes the electrochemical apparatus according to the embodiments of this application.

Based on a reasonable configuration of a silicon-based material and a graphite material, this application significantly improves cycle performance and a deformation rate of batteries by restricting a quantity of graphite particles present around a silicon-based particle.

Additional aspects and advantages of the embodiments of this application will be partially described and shown in the subsequent description, or explained through implementation of the embodiments of this application.

BRIEF DESCRIPTION OF DRAWINGS

Drawings necessary for describing the embodiments of this application or the prior art are briefly described below, to help describe the embodiments of this application. It is obvious that the drawings described below are only some of the embodiments of this application. Those skilled in the art may still obtain drawings of other embodiments based on the structures illustrated in these drawings without creative work.

DETAILED DESCRIPTION

Figure 1A:
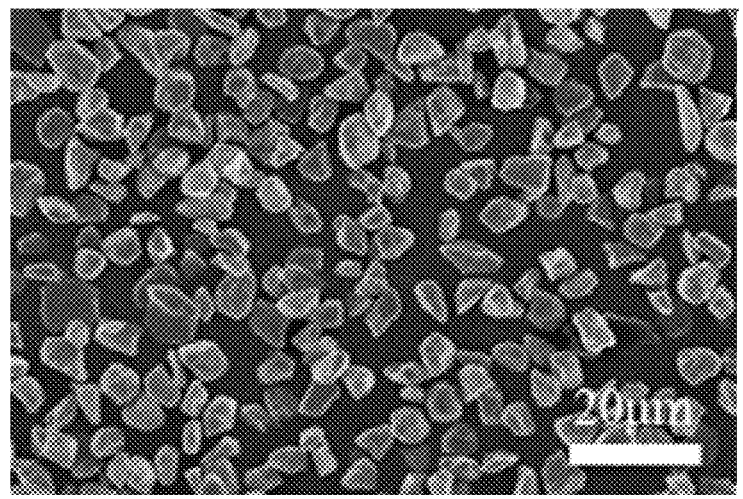
FIG. 1A is a scanning electron microscopy (SEM) image of a silicon oxide $SiO_x$ in Example 1.

Embodiments of this application are described in detail below. The embodiments of this application should not be construed as limitations on this application.

As is used in this application, the term "about" is used to describe and illustrate small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In this application, Dv50 is a corresponding particle size in µm when a cumulative volume percentage of a negative electrode active material reaches 50%.

In this application, Dn10 is a corresponding particle size in µm when a cumulative quantity percentage of the negative electrode active material reaches 10%.

In this application, a silicon composite includes elemental silicon, a silicon compound, a mixture of elemental silicon and a silicon compound, or a mixture of different silicides.

In this application, the term sphericity refers to a ratio of the smallest to the largest diameter of a particle.

In this application, "negative electrode gram capacity" refers to a gram capacity of the negative electrode active material used for preparing the negative electrode. For example, in embodiments of this application, the negative electrode active material is a mixture of graphite and a silicon-based negative electrode active material, so that the "negative electrode gram capacity" refers to the gram capacity of the mixture.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In specific embodiments and claims, a list of items connected by the terms "one of", "one piece of", "one kind of" or other similar terms may mean any one of the listed items. For example, if items A and B are listed, the phrase "one of A and B" means only A or only B. In another example, if items A, B, and C are listed, the phrase "one of A, B, and C" means only A, only B, or only C. The item A may contain one element or a plurality of elements. The item B may contain one element or a plurality of elements. The item C may contain one element or a plurality of elements.

In the specific embodiments and claims, an item list connected by the terms "at least one of", "at least one piece of", "at least one kind of" or other similar terms may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (exclusive of C); A and C (exclusive of B); B and C (exclusive of A); or all of A, B, and C. The item A may contain one element or a plurality of elements. The item B may contain one element or a plurality of elements. The item C may contain one element or a plurality of elements.

I. Negative Electrode

In an embodiment of this application, a negative electrode is provided, where the negative electrode includes a current collector and a negative electrode active material layer located on the current collector.

In some embodiments, the negative electrode active material layer includes silicon-based particles and graphite particles, where a quantity of graphite particles present within a vertical distance of about 0 to 6 μm to respective edges of the silicon-based particles is N, and based on a total quantity of the silicon-based particles, more than about 50% of the silicon-based particles satisfy: 6≤N≤17.

In some embodiments, N graphite particles, independent of each other, are entirely or partially within a vertical distance of about 6 μm to respective edges of the silicon-based particles. In some embodiments, each of the N graphite particles is entirely within a vertical distance of about 6 μm to respective edges of the silicon-based particles. In some embodiments, some of the N graphite particles are entirely within a vertical distance of about 6 μm to respective edges of the silicon-based particles, and each of the other graphite particles is only partially within the vertical distance of about 6 μm to the respective edges of the silicon-based particles.

In some embodiments, the silicon-based particles do not include particles with a smallest distance less than about 6 μm from their edges to the current collector and a surface of the negative electrode.

In some embodiments, more than about 60% of the silicon-based particles satisfy: 6≤N≤17. In some embodiments, more than about 70% of the silicon-based particles satisfy: 6≤N≤17. In some embodiments, more than about 80% of the silicon-based particles satisfy: 6≤N≤17. In some embodiments, more than about 90% of the silicon-based particles satisfy: 6≤N≤17.

In some embodiments, in an X-ray diffraction pattern, a highest intensity value of the silicon-based particles is I2 when 2θ is in a range of about 28.0° to 29.0°, and the highest intensity value is $I_1$ when 2θ is in a range of about 20.5° to 21.5°, where about 0<$I_2/I_1$≤about 1.

In some embodiments, in an X-ray diffraction pattern, a highest intensity value of the silicon-based particles is $I_2$ when 2θ is about 28.4°, and the highest intensity value is $I_1$ when 2θ is about 21.0°, where about 0<$I_2/I_1$≤about 1. In some embodiments, an $I_2/I_1$ value is about 0.3, about 0.5, about 0.7, or about 0.9.

In some embodiments, the Dv50 of the silicon-based particles ranges from about 2.5 μm to 10 μm. In some embodiments, the Dv50 of the silicon-based particles ranges from about 4 μm to 8 μm. In some embodiments, the Dv50 of the silicon-based particles ranges from about 4.5 μm to 6 μm.

In some embodiments, a particle size distribution of the silicon-based particles satisfies: about 0.3≤Dn10/Dv50≤about 0.6. In some embodiments, a particle size distribution of the silicon-based particles satisfies: about 0.4≤Dn10/Dv50≤about 0.5. In some embodiments, a particle size distribution of the silicon-based particles is about 0.35, about 0.45, or about 0.55.

In some embodiments, the silicon-based particle includes a silicon composite matrix and an oxide $MeO_y$ layer, and at least a part of the silicon composite matrix is coated with the oxide $MeO_y$ layer, where Me includes at least one of Al, Si, Ti, Mn, V, Cr, Co, or Zr, where y is 0.5 to 3; and where the oxide $MeO_y$ layer includes a carbon material.

In some embodiments, the oxide $MeO_y$ includes $Al_2O_3$, $TiO_2$, ZrO, MnO, $Mn_2O_3$, $Mn_3O_4$, $Co_3O_4$, $Cr_2O_3$, $SiO_2$, or any combination thereof.

In some embodiments, the carbon material in the oxide $MeO_y$ layer includes amorphous carbon, carbon nanotubes, carbon nanoparticles, carbon fiber, graphene, or any combination thereof. In some embodiments, the amorphous carbon is a carbon material obtained from a carbon precursor after sintering at a high temperature. In some embodiments, the carbon precursor includes polyvinylpyrrolidone, sodium carboxymethyl cellulose, polyvinyl alcohol, polypropylene acid, phenolic resin, polyester resin, polyamide resin, epoxy resin, polyurethane, polyacrylic resin, or any combination thereof.

In some embodiments, the silicon-based particle further includes a polymer layer, at least a part of the oxide $MeO_y$ layer is coated with the polymer layer, and the polymer layer includes a carbon material. In some embodiments, the polymer layer can be coated directly on a surface of the silicon composite matrix, that is, the silicon-based particle only includes the silicon composite matrix and the polymer layer.

In some embodiments, the polymer layer includes polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide, or any combination thereof.

In some embodiments, an average sphericity of the graphite particles is A, an average sphericity of the silicon-based particles is B, and A and B satisfy: about 0≤B−A≤about 0.3.

In some embodiments, a value of B-A is about 0.1, about 0.15, about 0.17, about 0.19, about 0.21, about 0.23, about 0.26, or about 0.29.

In some embodiments, the silicon composite matrix includes particles capable of intercalating and deintercalating lithium ions. In some embodiments, the silicon composite matrix includes a silicon-containing substance, where the silicon-containing substance in the silicon composite matrix can form a composite with one or more substances other than the silicon-containing substance in the negative electrode material.

In some embodiments, the silicon composite matrix includes $SiO_x$, with about $0.6 \leq x \leq$ about 1.5.

In some embodiments, the silicon composite matrix includes nanocrystalline Si grains, SiO, $SiO_2$, or any combination thereof.

In some embodiments, the nanocrystalline Si grain is less than about 100 nm in size. In some embodiments, the nanocrystalline Si grain is less than about 50 nm in size. In some embodiments, the nanocrystalline Si grain is less than about 20 nm in size. In some embodiments, the nanocrystalline Si grain is less than about 5 nm in size. In some embodiments, the nanocrystalline Si grain is less than about 2 nm.

In some embodiments, the oxide $MeO_y$ layer is about 0.5 nm to 1000 nm in thickness. In some embodiments, the oxide $MeO_y$ layer is about 1 nm to 500 nm in thickness. In some embodiments, the oxide $MeO_y$ layer is about 1 nm to 100 nm in thickness. In some embodiments, the oxide $MeO_y$ layer is about 1 nm to 20 nm in thickness. In some embodiments, the oxide $MeO_y$ layer is about 2 nm, about 10 nm, about 20 nm, or about 50 nm in thickness.

In some embodiments, based on a total weight of the silicon-based particles, a percentage by weight of the Me element is about 0.005 wt % to 1 wt %. In some embodiments, based on a total weight of the silicon-based particles, a percentage by weight of the Me element is about 0.01 wt % to 1 wt %. In some embodiments, based on a total weight of the silicon-based particles, a percentage by weight of the Me element is about 0.02 wt % to 0.9 wt %. In some embodiments, based on a total weight of the silicon-based particles, a percentage by weight of the Me element is about 0.05 wt %, about 0.1 wt %, about 0.2 wt %, about 0.3 wt %, about 0.4 wt %, about 0.5 wt %, about 0.6 wt %, about 0.7 wt %, or about 0.8 wt %.

In some embodiments, based on a total weight of the silicon-based particles, a percentage by weight of the carbon material in the oxide $MeO_y$ layer is about 0.01 wt % to 1 wt %. In some embodiments, based on a total weight of the silicon-based particles, a percentage by weight of the carbon material in the oxide $MeO_y$ layer is about 0.1 wt % to 0.9 wt %. In some embodiments, based on a total weight of the silicon-based particles, a percentage by weight of the carbon material in the oxide $MeO_y$ layer is about 0.2 wt % to 0.8 wt %. In some embodiments, based on a total weight of the silicon-based particles, a percentage by weight of the carbon material in the oxide $MeO_y$ layer is about 0.3 wt %, about 0.4 wt %, about 0.5 wt %, about 0.6 wt %, or about 0.7 wt %.

In some embodiments, the carbon material in the polymer layer includes carbon nanotubes, carbon nanoparticles, carbon fiber, graphene, or any combination thereof.

In some embodiments, based on a total weight of the silicon-based particles, a percentage by weight of the polymer layer is about 0.05 to 5 wt %. In some embodiments, based on a total weight of the silicon-based particles, a percentage by weight of the polymer layer is about 0.1 to 4 wt %. In some embodiments, based on a total weight of the silicon-based particles, a percentage by weight of the polymer layer is about 0.5 to 3 wt %. In some embodiments, based on a total weight of the silicon-based particles, a percentage by weight of the polymer layer is about 1 wt %, about 1.5 wt %, or about 2 wt %.

In some embodiments, the polymer layer is about 1 nm to 100 nm in thickness. In some embodiments, the polymer layer is about 5 nm to 90 nm in thickness. In some embodiments, the polymer layer is about 10 nm to 80 nm in thickness. In some embodiments, the polymer layer is about 5 nm, about 20 nm, about 30 nm, about 40 nm, about 50 nm, about 60 nm, or about 70 nm in thickness.

In some embodiments, a specific surface area of the negative electrode material is about 1 to 50 $m^2/g$. In some embodiments, a specific surface area of the negative electrode material is about 5 to 40 $m^2/g$. In some embodiments, a specific surface area of the negative electrode material is about 10 to 30 $m^2/g$. In some embodiments, a specific surface area of the negative electrode material is about 1 $m^2/g$, about 5 $m^2/g$, or about 10 $m^2/g$.

In some embodiments, an average sphericity of the silicon-based particles is about 0.8 to 1.0. In some embodiments, an average sphericity of the silicon-based particles is about 0.85, about 0.9, or about 0.95.

In some embodiments, a quantity of silicon-based particles with a sphericity less than about 0.8 is less than or equal to about 10% of the total quantity of the silicon-based particles. In some embodiments, a quantity of silicon-based particles with a sphericity less than about 0.8 is less than or equal to about 8%, about 7%, about 6%, or about 5% of the total quantity of the silicon-based particles.

In some embodiments, an average sphericity of the graphite particles is about 0.5 to 0.8. In some embodiments, an average sphericity of the graphite particles is about 0.55, about 0.6, about 0.65, or about 0.75.

In some embodiments, a quantity of graphite particles with a sphericity of about 0.5 to 0.8 is greater than or equal to about 95% of a total quantity of the graphite particles. In some embodiments, a quantity of graphite particles with a sphericity of about 0.5 to 0.8 is greater than or equal to about 96%, about 97%, or about 98% of a total quantity of the graphite particles.

In some embodiments, the graphite particles in Raman spectroscopy analysis exhibit a scattering peak $I_{1330}$ at about 1330 $cm^{-1}$, and a scattering peak $I_{1580}$ at about 1580 $cm^{-1}$, and a ratio of $I_{1330}/I_{1580}$ satisfies about $0.7<I_{1330}/I_{1580}<$about 2.0.

In some embodiments, a ratio of $I_{1330}/I_{1580}$ satisfies about $0.8<I_{1330}/I_{1580}<$about 1.8. In some embodiments, a ratio of $I_{1330}/I_{1580}$ satisfies about $1<I_{1330}/I_{1580}<$about 1.5.

In some embodiments, a particle size Dv50 of the graphite particles is about 0.01 to 80 μm. In some embodiments, a particle size Dv50 of the graphite particles is about 1 to 70 μm. In some embodiments, a particle size Dv50 of the graphite particles is about 5 to 60 μm. In some embodiments, a particle size Dv50 of the graphite particles is about 10 to 50 μm. In some embodiments, a particle size Dv50 of the graphite particles is about 15 μm, about 20 μm, about 25 μm, about 30 μm, about 35 μm, about 40 μm, or about 45 μm.

In some embodiments, a specific surface area of the graphite particles is less than or equal to about 30 $m^2/g$. In some embodiments, a specific surface area of the graphite particles is less than or equal to about 25 $m^2/g$. In some embodiments, a specific surface area of the graphite particles is less than or equal to about 20 $m^2/g$. In some embodiments, a specific surface area of the graphite particles is less than or equal to about 15 $m^2/g$.

In some embodiments, the X-ray diffraction pattern of the graphite particles includes a 004 diffraction pattern and a 110 diffraction pattern. A c-axial length C004 of a unit cell length can be obtained from the 004 diffraction pattern, an a-axial length C110 of the unit cell length can be obtained from the 110 diffraction pattern, and a ratio C004/C110 of the both is an orientation index (Orientation Index, OI for short) of the graphite particles, where the OI value of the graphite particles is about 1 to 30.

In some embodiments, the OI value of the graphite particles is about 1 to 20. In some embodiments, the OI value of the graphite particles is about 5, about 10, or about 15.

In some embodiments, a method for preparing silicon-based particles satisfying about $0<I_2/I_1<$about 1 includes:

(1) mixing silicon dioxide and metal silicon powder at a molar ratio of about 1:5 to 5:1 to obtain a mixed material;

(2) heating the mixed material at a pressure ranging from about $10^{-4}$ to $10^{-1}$ kPa and at a temperature ranging from about 1100 to 1550° C. for about 0.5 to 24 hours to obtain a gas;

(3) condensing the gas to obtain a solid;

(4) crushing and sieving the solid to obtain the silicon-based particles; and (5) applying heat treatment to the solid at a temperature ranging from about 400 to 1200° C. for about 1 to 24 hours and cooling the heat-treated solid to obtain the silicon-based particles.

In some embodiments, a molar ratio of the silicon dioxide to the metal silicon powder is about 1:4 to 4:1. In some embodiments, the molar ratio of the silicon dioxide to the metal silicon powder is about 1:3 to 3:1. In some embodiments, the molar ratio of the silicon dioxide to the metal silicon powder is about 1:2 to 2:1. In some embodiments, the molar ratio of the silicon dioxide to the metal silicon powder is about 1:1.

In some embodiments, the pressure range is about $10^{-4}$ to $10^{-1}$ kPa. In some embodiments, the pressure is about 1 Pa, about 10 Pa, about 20 Pa, about 30 Pa, about 40 Pa, about 50 Pa, about 60 Pa, about 70 Pa, about 80 Pa, about 90 Pa, or about 100 Pa.

In some embodiments, the heating temperature is about 1100 to 1450° C. In some embodiments, the heating temperature is about 1200° C. or about 1400° C.

In some embodiments, the heating time is about 1 to 20 hours. In some embodiments, the heating time is about 5 to 15 hours. In some embodiments, the heating time is about 2 hours, about 4 hours, about 6 hours, about 8 hours, about 10 hours, about 12 hours, about 14 hours, about 16 hours, or about 18 hours.

In some embodiments, mixing is performed by using a ball mill, a V-type mixer, a three-dimensional mixer, an air-flow mixer or a horizontal mixer.

In some embodiments, heating is performed under protection of an inert gas. In some embodiments, the inert gas includes nitrogen, argon, helium or a combination thereof.

In some embodiments, the heat treatment temperature is about 400 to 1200° C. In some embodiments, the heat treatment temperature is about 600° C., about 800° C., or about 1000° C.

In some embodiments, the heat treatment time is about 1 to 24 hours. In some embodiments, the heat treatment time is about 2 to 12 hours. In some embodiments, the heat treatment time is about 5 hours, about 10 hours, or about 15 hours.

In some embodiments, a method for preparing silicon-based particles with an oxide $MeO_y$ coating layer on the surface is:

(1) mixing the foregoing solid or a commercially available silicon oxide $SiO_x$ obtained after classification, a carbon precursor, and an oxide precursor $MeT_n$ in an organic solvent and deionized water to form a mixed solution;

(2) drying the mixed solution to obtain powder; and (3) sintering the powder at a temperature of about 250 to 900° C. for about 0.5 to 24 hours to obtain silicon-based particles with an oxide $MeO_y$ layer on the surface, where x is about 0.5 to 1.5; and y is about 0.5 to 3, where the Me includes at least one of Al, Si, Ti, Mn, Cr, V, Co, or Zr, where the T includes at least one of a methoxy group, an ethoxy group, an isopropoxy group, or halogen, and where n is 1, 2, 3, or 4.

In some embodiments, the oxide precursor $MeT_n$ includes titanium tetraisopropanolate, aluminium isopropoxide, or a combination thereof.

In some embodiments, the carbon material includes amorphous carbon, carbon nanotubes, carbon nanoparticles, carbon fiber, graphene, or any combination thereof. In some embodiments, the amorphous carbon is a carbon material obtained from a carbon precursor after sintering at a high temperature. In some embodiments, the carbon precursor includes polyvinylpyrrolidone, sodium carboxymethyl cellulose, polyvinyl alcohol, polypropylene, acid phenolic resin, polyester resin, polyamide resin, epoxy resin, polyurethane, polyacrylic resin, or any combination thereof.

In some embodiments, the sintering temperature is about 300 to 800° C. In some embodiments, the sintering temperature is about 400 to 700° C. In some embodiments, the sintering temperature is about 400 to 650° C. In some embodiments, the sintering temperature is about 500° C. or about 600° C.

In some embodiments, the sintering time is about 1 to 20 hours. In some embodiments, the sintering time is about 1 to 15 hours. In some embodiments, the sintering time is about 1 to 10 hours. In some embodiments, the sintering time is about 1.5 to 5 hours. In some embodiments, the sintering time is about 2 hours, about 3 hours, or about 4 hours.

In some embodiments, the organic solvent includes at least one of the following solvents: ethanol, methanol, n-hexane, N,N-dimethylformamide, pyrrolidone, acetone, toluene, isopropanol, or n-propyl alcohol. In some embodiments, the organic solvent is ethanol.

In some embodiments, the halogen includes F, Cl, Br, and a combination thereof.

In some embodiments, sintering is performed under protection of an inert gas. In some embodiments, the inert gas includes nitrogen, argon, or a combination thereof.

In some embodiments, the drying is spray drying, and the drying temperature is about 100 to 300° C.

In some embodiments, a method for preparing silicon-based particles with a polymer coating layer on the surface is:

(1) dispersing the foregoing solid obtained after crushing and sieving, a commercially available silicon oxide $SiO_x$ or silicon-based particles with oxide $MeO_y$ layer on the surface, the carbon material, and the polymer in a solvent at a high speed for about 1 to 15 hours to obtain a suspension; and (2) removing the solvent in the suspension, where x is about 0.5 to 1.5.

In some embodiments, the dispersing time is about 2 hours, about 4 hours, about 6 hours, about 8 hours, or about 10 hours.

In some embodiments, the polymer includes polyvinylidene fluoride and its derivatives, carboxymethyl cellulose and its derivatives, sodium carboxymethyl cellulose and its derivatives, polyvinylpyrrolidone and its derivatives, polyacrylic acid and its derivatives, polystyrene-butadiene rubber, polyacrylamide, polyimide, polyamideimide, or any combination thereof.

In some embodiments, the carbon material includes carbon nanotubes, carbon nanoparticles, carbon fiber, graphene, or any combination thereof.

In some embodiments, the solvent includes water, ethanol, methanol, tetrahydrofuran, acetone, trichloromethane, N-methylpyrrolidone, dimethylformamide, dimethylacetamide, methylbenzene, dimethylbenzene, or any combination thereof.

Figure 1B:
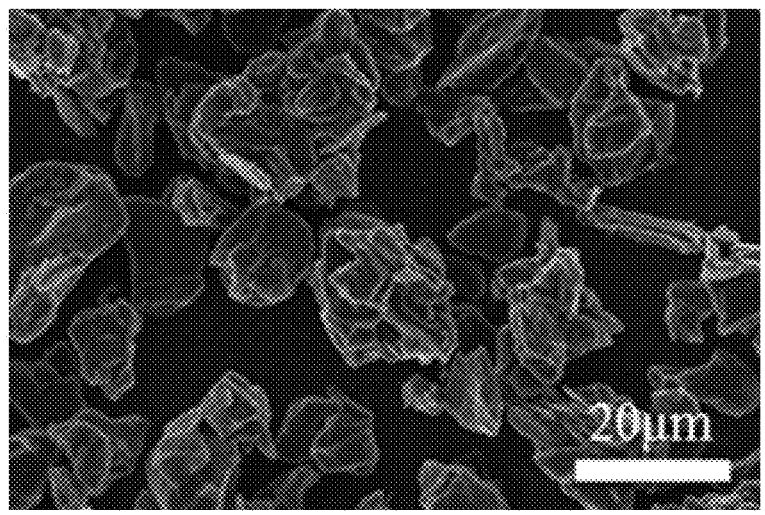
FIG. 1B is a SEM image of graphite particles in Example 1.
Figure 1C:
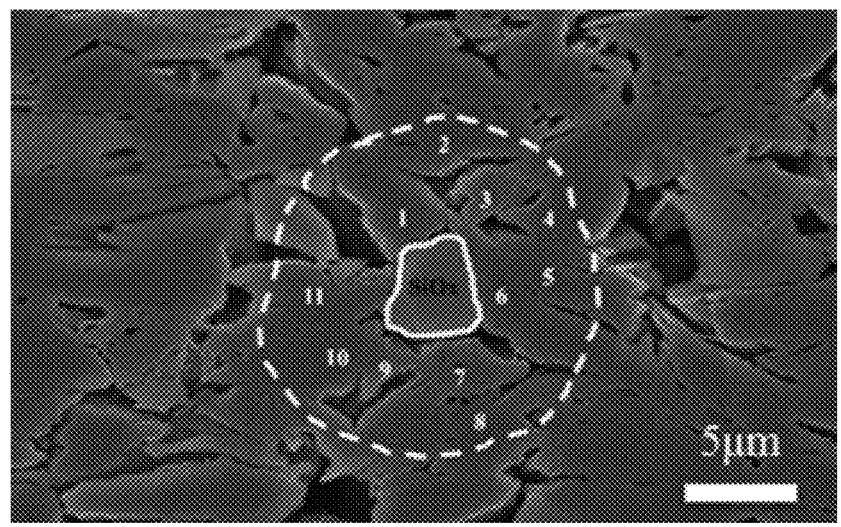
FIG. 1C and FIG. 1D are respectively SEM images of a portion of a section of a negative electrode in Example 1.
Figure 1D:
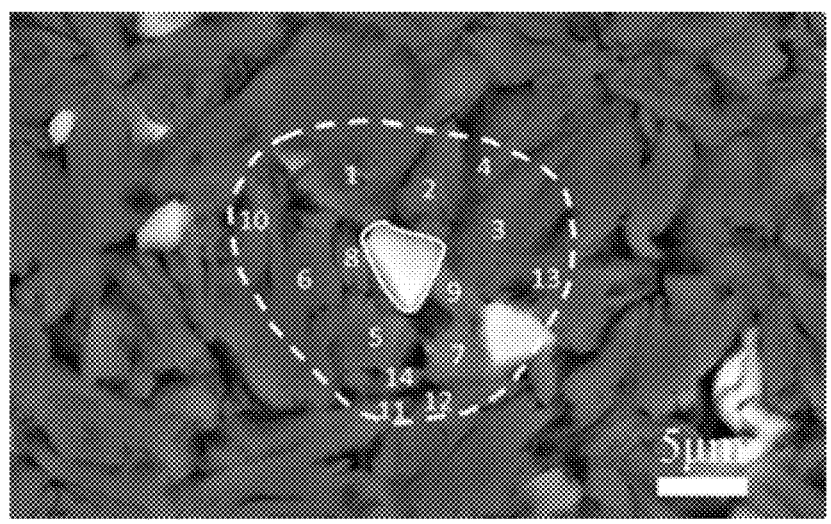
Figure 2A:
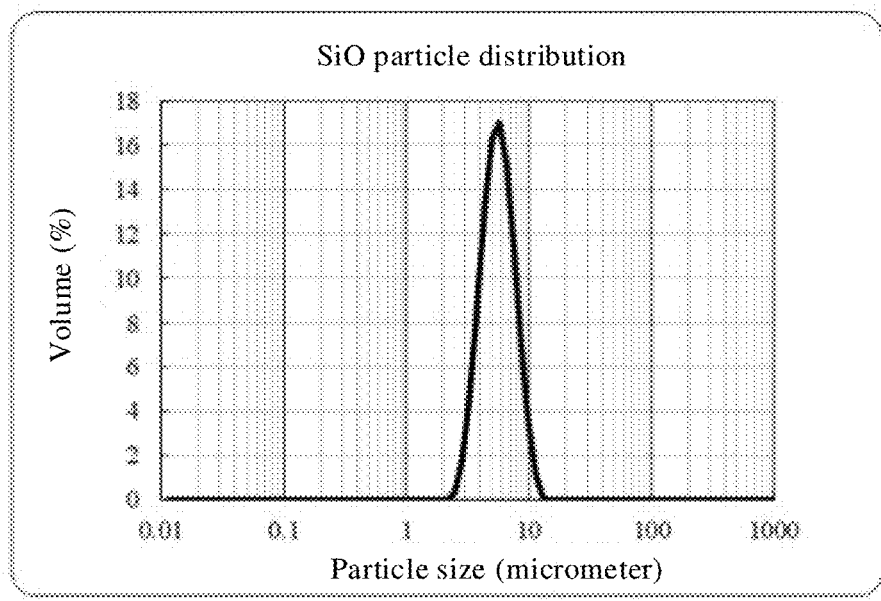
FIG. 2A shows a particle size distribution curve of the silicon oxide $SiO_x$ in Example 1.
Figure 2B:
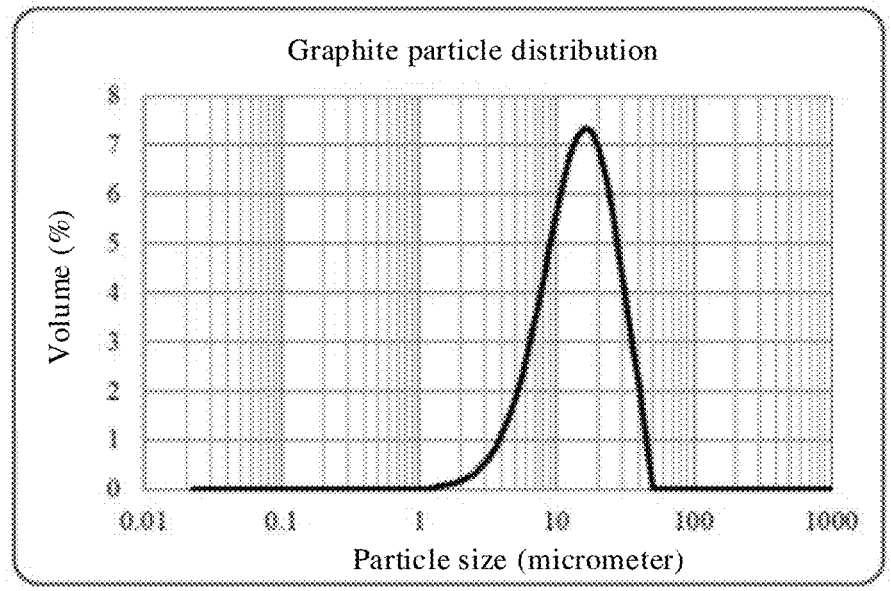
FIG. 2B is a particle size distribution curve of the graphite in Example 1.

FIG. 1A is a SEM image of a silicon oxide $SiO_x$ in Example 1; FIG. 1B is a SEM image of graphite particles in Example 1; and FIG. 1C and FIG. 1D are respectively SEM images of a portion of a section of a negative electrode in Example 1. FIG. 2A shows a particle size distribution curve of the silicon oxide $SiO_x$ in Example 1, and FIG. 2B is a particle size distribution curve of the graphite in Example 1.

As can be seen from FIG. 1C, a quantity of graphite particles present within a vertical distance of about 6 μm to an edge of a silicon-based particle is 11. As can be seen from FIG. 1D, a quantity of graphite particles present within a vertical distance of about 6 μm to an edge of another silicon-based particle is 14.

In industry, a negative electrode is generally prepared by mixing a silicon oxide with a graphite material in a specific ratio. In the prior art, interests are only focused on improvements to silicon oxides to improve negative electrode performance, neglecting the impact of a reasonable configuration of silicon oxides and graphite particles on the negative electrode performance. The silicon oxide particles and the graphite particles are not consistent in volume swelling during lithiation. In this application, it is found that the overall swelling stress of the negative electrode can be uniformly distributed by making a reasonable configuration of silicon oxide particles and graphite particles in the negative electrode. This makes the silicon oxide particles engaged with each other like gears in voids between the graphite particles, increasing the compacted density of the negative electrode, and can inhibit displacement of the particles due to the swelling, reducing deformation of the negative electrode, and prolonging the cycle life of the battery. Therefore, a reasonable configuration of silicon oxide particles and graphite particles is of great significance to improve the battery performance.

Figure 3A:
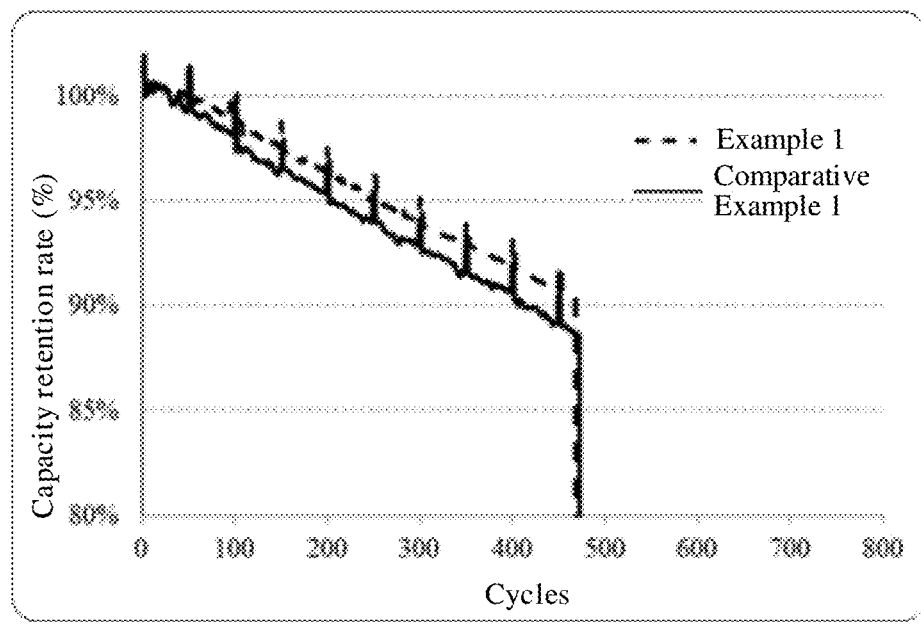
FIG. 3A shows cycling degradation curves of lithium-ion batteries in Example 1 and Comparative Example 1.
Figure 3B:
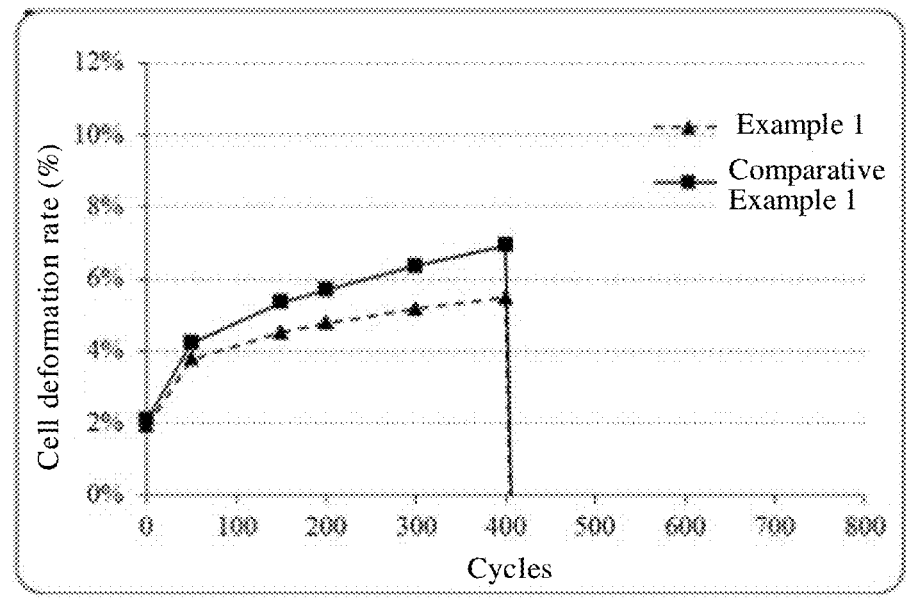
FIG. 3B shows battery deformation curves of Example 1 and Comparative Example 1.

FIG. 3A shows cycling degradation curves of lithium-ion batteries in Example 1 and Comparative Example 1; and FIG. 3B shows lithium-ion battery deformation curves of Example 1 and Comparative Example 1.

As can be seen from FIG. 3A, a capacity retention rate in Example 1 is greater than that in Comparative Example 1. As can be seen from FIG. 3B, a battery deformation rate in Example 1 is less than that in Comparative Example 1.

Figure 3C:
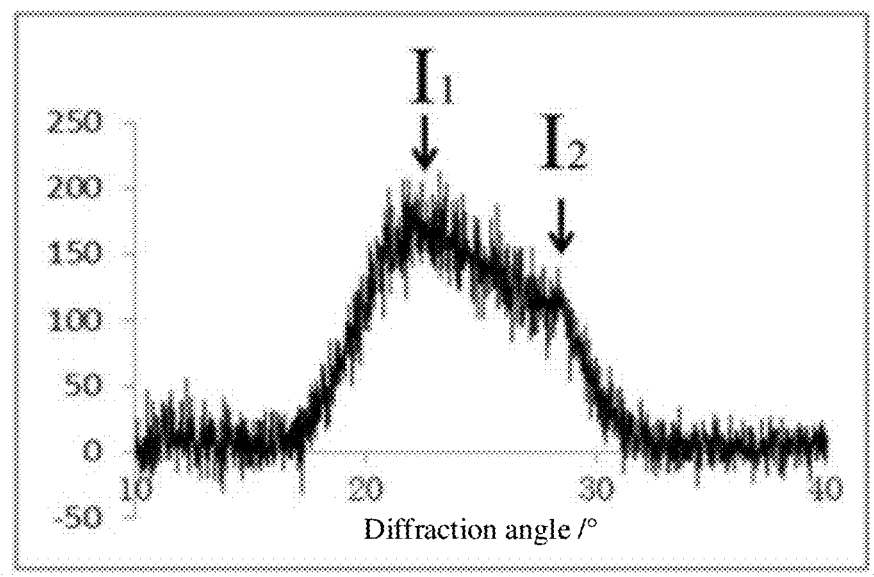
FIG. 3C is an X-ray diffraction (XRD) diagram of a negative electrode active material in Example 10.

FIG. 3C is an X-ray diffraction (XRD) diagram of a negative electrode active material in Example 10 of this application. As can be seen from FIG. 3C, in an X-ray diffraction pattern, a highest intensity value of the negative electrode active material is $I_2$ when 2θ is in a range of about 28.0° to 29.0°, and the highest intensity value is $I_1$ when 2θ is in a range of about 20.5° to 21.5°, where about $0<I_2/I_1\leq$about 1. The $I_2/I_1$ value reflects a degree of influence by disproportionation of the material. The greater the $I_2/I_1$ value, the greater the size of nano-silicon crystal grains in the negative electrode active material. When the $I_2/I_1$ value is greater than 1, the stress in a local region of the negative electrode active material is increased rapidly in a lithiation process, leading to structural deterioration of the negative electrode active material during cycling. In addition, due to occurrence of nanocrystalline distribution, a grain boundary diffusion ability in an ion diffusion process is affected. It is found by the inventors of this application that when the $I_2/I_1$ value satisfies $0<I_2/I_1<1$, the negative electrode active material has good cycle performance, and the lithium-ion battery made thereof has good anti-swelling performance.

Figure 3D:
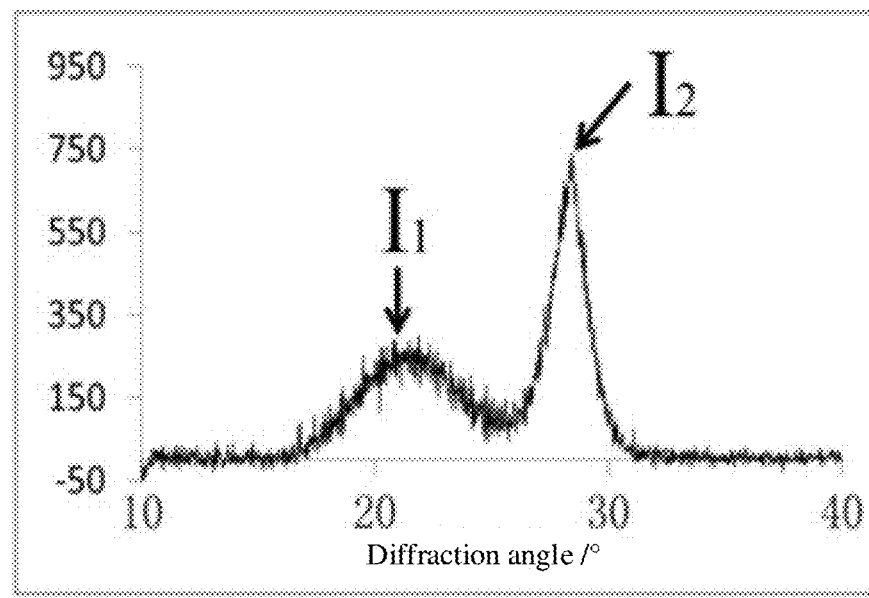
FIG. 3D is an X-ray diffraction diagram of a negative electrode active material in Comparative Example 4.

FIG. 3D is an X-ray diffraction (XRD) diagram of a negative electrode active material in Comparative Example 4 of this application. As can be seen from FIG. 3D, the $I_2/I_1$ of the negative electrode active material in Comparative Example 4 is obviously greater than 1. Compared with the negative electrode active material in Example 1, the cycle performance of the negative electrode active material in Comparative Example 4 is poor, the swelling rate of the lithium-ion battery made thereof is relatively high and the rate performance is poor.

Figure 4:
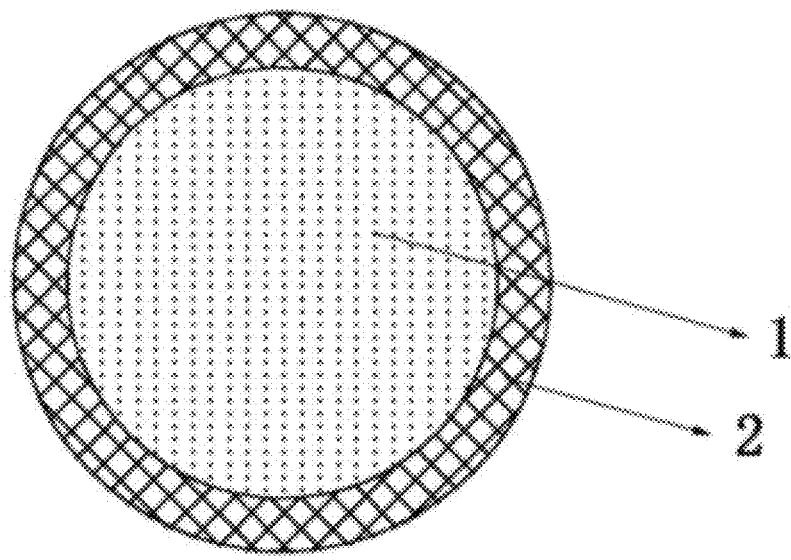
FIG. 4 is a schematic structural diagram of a negative electrode active material according to an embodiment of this application.

FIG. 4 is a schematic structural diagram of a negative electrode active material according to an embodiment of this application. An inner layer 1 is a silicon composite matrix, and an outer layer 2 is an oxide $MeO_y$ layer containing a carbon material.

The oxide $MeO_y$ layer coated on the silicon composite matrix can play a role of HF trapping agent. The oxide may react with the HF in an electrolytic solution to reduce the HF content in the electrolytic solution during cycling, and reduce the etching of the surface of the silicon material by the HF, thereby further improving the cycle performance of the material. The oxide $MeO_y$ layer doped with a specific amount of carbon can enhance conductivity of the negative electrode active material, and reduce polarization during cycling.

Figure 5:
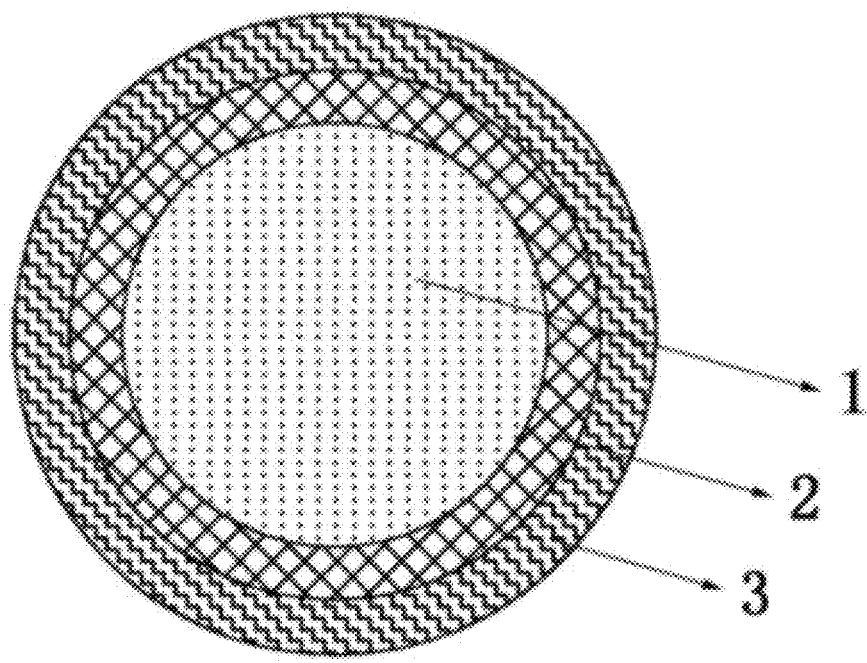
FIG. 5 is a schematic structural diagram of a negative electrode active material according to another embodiment of this application.

FIG. 5 is a schematic structural diagram of a negative electrode active material according to another embodiment of this application. An inner layer 1 is a silicon composite matrix, an intermediate layer 2 is an oxide $MeO_y$ layer containing a carbon material, and an outer layer 3 is a polymer layer containing a carbon material. The negative electrode active material of this application may also have only the silicon composite matrix and the polymer layer, without the $MeO_y$ layer. To be specific, the polymer layer of this application may be coated directly on a surface of the silicon composite matrix.

The polymer layer containing carbon nanotubes (CNT) is coated on a surface of the negative electrode active material, and the polymer can be used to bind the CNTs to the surface of the negative electrode active material, which is beneficial to improving interface stability on the surface of the negative electrode active material and constrain silicon-based particles from offset, thereby improving their cycle performance and deformation.

In some embodiments, the negative electrode active material layer includes a binder. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, or nylon.

In some embodiments, the negative electrode active material layer includes a conductive material. In some embodiments, the conductive material includes, but is not limited to: natural graphite, artificial graphite, carbon black, acetylene black, Ketjen black, carbon fiber, metal powder, metal fiber, copper, nickel, aluminum, silver or polyphenylene derivatives.

In some embodiments, the current collector includes, but is not limited to: copper foil, nickel foil, stainless steel foil, titanium foil, foamed nickel, foamed copper or a polymer base coated with conductive metal.

In some embodiments, the negative electrode may be obtained by using a following method: mixing the active material, the conductive material and the binder in a solvent to prepare an active material composition, and applying the active material composition on the current collector.

In some embodiments, the solvent may include, but is not limited to: N-methylpyrrolidone.

II. Positive Electrode

Materials, components and manufacturing methods of a positive electrode which can be used in the embodiments of this application include any technology disclosed in the prior art. In some embodiments, the positive electrode is the one described in US patent application U.S. Pat. No. 9,812,739B, which is incorporated in this application by reference in its entirety.

In some embodiments, the positive electrode includes a current collector and a positive electrode active material layer located on the current collector.

In some embodiments, the positive electrode active material includes, but is not limited to: lithium cobalt oxide ($LiCoO_2$), a lithium-nickel-cobalt-manganese (NCM) ternary material, lithium iron phosphate ($LiFePO_4$) or lithium manganate ($LiMn_2O_4$).

In some embodiments, the positive electrode active material layer further includes a binder, and optionally includes a conductive material. The binder enhances binding between particles of the positive-electrode active material, and binding between the positive-electrode active material and the current collector.

In some embodiments, the binder includes, but is not limited to: polyvinyl alcohol, hydroxypropyl cellulose, diacetyl cellulose, polyvinyl chloride, carboxylated polyvinyl chloride, polyvinyl fluoride, polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, nylon, or the like.

In some embodiments, the conductive material includes, but is not limited to: a carbon-based material, a metal-based material, a conductive polymer and a mixture thereof. In some embodiments, the carbon-based material is selected from natural graphite, artificial graphite, carbon black, acetylene black, Ketjen black, carbon fiber or any combination thereof. In some embodiments, the metal-based material is selected from metal powder, metal fiber, copper, nickel, aluminum or silver. In some embodiments, the conductive polymer is a polyphenylene derivative.

In some embodiments, the current collector may include, but is not limited to: aluminum.

The positive electrode can be prepared by a preparation method known in the art. For example, the positive electrode can be obtained by using a following method: mixing the active material, the conductive material and the binder in a solvent to prepare an active material composition, and applying the active material composition on the current collector. In some embodiments, the solvent may include, but is not limited to: N-methylpyrrolidone.

III. Electrolytic Solution

An electrolytic solution which can be used in the embodiments of this application may be an electrolytic solution known in the prior art.

In some embodiments, the electrolytic solution includes an organic solvent, a lithium salt and an additive. The organic solvent of the electrolytic solution according to this application may be any organic solvent known in the prior art which can be used as a solvent of the electrolytic solution. An electrolyte used in the electrolytic solution according to this application is not limited, and may be any electrolyte known in the prior art. The additive of the electrolytic solution according to this application may be any additive known in the prior art which can be used as an additive of the electrolytic solution.

In some embodiments, the organic solvent includes, but is not limited to: ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of an organic lithium salt or an inorganic lithium salt.

In some embodiments, the lithium salt includes, but is not limited to: lithium hexafluorophosphate ($LiPF_6$), lithium tetrafluoroborate ($LiBF_4$), lithium difluorophosphate ($LiPO_2F_2$), lithium bistrifluoromethanesulfonimide LiN$(CF_3SO_2)_2$(LiTFSI), lithium bis(fluorosulfonyl)imide Li(N$(SO_2F)_2$)(LiFSI), lithium bis(oxalate) borate $LiB(C_2O_4)_2$ (LiBOB) or lithium difluoro(oxalato)borate $LiBF_2(C_2O_4)$ (LiDFOB).

In some embodiments, a concentration of the lithium salt in the electrolytic solution is about 0.5 to 3 mol/L, about 0.5 to 2 mol/L or about 0.8 to 1.5 mol/L.

IV. Separator

In some embodiments, a separator is provided between the positive electrode and the negative electrode to prevent a short circuit. A material and shape of the separator which can be used in the embodiments of this application may include any technology disclosed in the prior art. In some embodiments, the separator includes a polymer or an inorganic substance formed by a material stable to the electrolytic solution of this application.

For example, the separator may include a substrate layer and a surface treatment layer. The substrate layer is a non-woven fabric, a membrane or a composite membrane having a porous structure, and a material of the substrate layer is selected from at least one of polyethylene, polypropylene, polyethylene terephthalate and polyimide. Specifically, a polypropylene porous membrane, a polyethylene porous membrane, a polypropylene non-woven fabric, a polyethylene non-woven fabric or a polypropylene-polyethylene-polypropylene porous composite membrane can be selected.

The surface treatment layer is provided on at least one surface of the substrate layer, and the surface treatment layer may be a polymer layer or an inorganic layer, or may be a layer formed by a mixed polymer and an inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from a combination of one or more of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer contains a polymer, and a material of the polymer is selected from at least one of polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

V. Electrochemical Apparatus

Embodiments of this application provide an electrochemical apparatus, which includes any apparatus where electrochemical reactions take place.

In some embodiments, the electrochemical apparatus of this application includes a positive electrode having a positive electrode active material capable of occluding and releasing metal ions; a negative electrode according to the embodiments of this application; an electrolytic solution; and a separator placed between the positive electrode and the negative electrode.

In some embodiments, the electrochemical apparatus of this application includes, but is not limited to: all kinds of primary batteries, secondary batteries, fuel cells, solar cells or capacitors.

In some embodiments, the electrochemical apparatus is a lithium secondary battery.

In some embodiments, the lithium secondary battery includes, but is not limited to: a lithium metal secondary battery, a lithium-ion secondary battery, a lithium polymer secondary battery or a lithium-ion polymer secondary battery.

VI. Electronic Apparatus

An electronic apparatus of this application may be any apparatus using the electrochemical apparatus according to the embodiments of this application.

In some embodiments, the electronic apparatus includes, but is not limited to: notebook computers, pen-input computers, mobile computers, e-book players, portable phones, portable fax machines, portable copiers, portable printers, head-mounted stereo headsets, video recorders, liquid crystal display televisions, portable cleaners, portable CD players, mini discs, transceivers, electronic notebooks, calculators, memory cards, portable recorders, radios, backup power supplies, motors, automobiles, motorcycles, assisted bicycles, bicycles, lighting apparatuses, toys, game machines, clocks, electric tools, flashlights, cameras, large household storage batteries, lithium-ion capacitors, or the like.

Lithium-ion batteries are taken as an example below in conjunction with specific examples to describe preparation of a lithium-ion battery. Those skilled in the art should understand that the preparation method described in this application is only an example, and any other suitable preparation methods are within the scope of this application.

EXAMPLES

Performance evaluation is carried out below based on examples and comparative examples of the lithium-ion battery of this application.

I. Performance Evaluation Method for Negative Electrode Active Materials

1. Property Test Method for Negative Electrode Active Material Powder (1) Observation of microscopic morphology of powder particles: A scanning electron microscopy was used to observe the microscopic morphology of the powder and characterize coating of the material surface. The selected test instrument was OXFORD EDS (X-max-20 mm$^2$), and the accelerated voltage was 15 KV. The focus was adjusted to start observation at a high magnification of 50K, and particle agglomeration was mainly observed at low magnifications of 500 to 2000.

(2) Average sphericity test: Image capture and processing were performed on a specific quantity (greater than 5000) of dispersed particles with a Malvern automatic image particle size analyzer, then the microstructure and morphology of the particles were accurately analyzed by utilizing the morphologically directed Raman spectroscopy (MDRS) technology to obtain the longest diameters and the shortest diameters of all particles. A ratio of the shortest diameter to the longest diameter of each particle was calculated to obtain a sphericity of the particle, and an average sphericity was obtained by averaging all sphericities of all the particles.

(3) Specific surface area test: At a constant low temperature, after amounts of gas adsorbed by a solid surface under different relative pressures were tested, an adsorption amount of a monomolecular layer of the sample was found based on the Brunauer-Emmett-Teller adsorption theory and its equation (BET equation), to calculate a specific surface area of the solid.

About 1.5 to 3.5 g of powder sample was weighted and taken into a sample tube in TriStar II 3020, and tested after degassing for 120 minutes at about 200° C.

(4) Particle size test: A powder sample of about 0.02 g was put into a 50 ml clean beaker, about 20 ml deionized water was added into the beaker with a few drops of surfactants (1%) added to disperse the powder completely in the water. Then the beaker was placed into a 120 W ultrasonic cleaning machine for ultrasonic processing for 5 minutes, and after that, a MasterSizer 2000 was used to test the particle size distribution.

(5) Carbon content test: A sample was heated and burnt at a high temperature by a high-frequency furnace under an oxygen-rich condition, to oxidize the carbon and sulfur into carbon dioxide and sulfur dioxide respectively, the gases, after being processed, entered into corresponding absorption pools to absorb corresponding infrared radiation, and then a corresponding signal was generated by a detector through conversion. This signal was sampled by a computer, linearly corrected, and converted into a numerical value which was proportional to carbon dioxide and the sulfur dioxide concentrations. Then values taken during the entire analysis process were accumulated. After the analysis completed, in the computer, this accumulated value was divided by the weight value, then multiplied by a correction factor, and deducted by a blank value to obtain the carbon and sulfur percent contents in the sample. The sample test was performed by using a high-frequency infrared carbon and sulfur analyzer (HCS-140, Shanghai Dekai).

(6) XRD test: A sample of 1.0 to 2.0 g was weighed, poured into a groove of a glass sample holder, and compacted and smoothed with a glass sheet. Then, the sample was tested by using an X-ray diffractometer (Brook, D8) according to JJS K 0131-1996 "General Principles of X-Ray Diffraction Analysis", with a test voltage set to 40 kV, a current to 30 mA, a scanning angle range to 10 to 85°, a scanning step to 0.0167°, and a time for each step to 0.24 seconds. Then, an XRD diffraction pattern was obtained from which a highest intensity value $I_2$ when 2θ is 28.4° and a highest intensity value $I_1$ when 2θ is 21.0° were obtained. Then, a ratio of the $I_2/I_1$ was calculated.

(7) Metal element test: A sample of a given amount was weighed and added into a given amount of concentrated nitric acid. Then microwave digestion was performed to obtain a solution. The obtained solution and a filter residue were washed several times and diluted to a given volume. Then, an ICP-OES test was run to measure plasma intensity of a metal element therein. Metal content in the solution was calculated based on a standard curve of the measured metal, thus obtaining an amount of the metal element in the material.

(8) Negative electrode porosity test: A sheet-punching machine was used to die cut the negative electrode into small discs with a diameter of 13 mm, and a micrometer was used to measure the thickness of the small discs. A specific quantity of small discs were placed into a sample bin of AccuPyc 1340. After the sample was purged for 30 times with helium gas, the helium gas was passed into the bin according to a procedure. The true volume inside the sample bin was calculated by testing the pressure inside the sample bin by using Boyle'/s law PV=nRT. The quantity of the small discs was counted after the test was completed, and the apparent volume of the sample was calculated. The sample porosity was obtained as follows: 1—true volume/apparent volume.

(9) Method for testing a compacted density of the negative electrode: A small disc with an area of S was obtained by using a sheet-punching machine to die cut the negative electrode, with its weighed mass denoted by $M_1$, and its thickness measured by a micrometer and denoted by $H_1$. A same sheet-punching machine was used to die cut a current collector to obtain a small disc with the same area, with its weighed mass denoted by $M_2$, and its thickness measured by a micrometer and denoted by $H_2$. The compacted density of the negative electrode was: $(M_1-M_2)/(H_1-H_2)/S$.

(10) Method for testing a percentage of silicon-based particles satisfying that a quantity N of graphite particles present within a vertical distance of 0 to 6 μm to respective edges of the silicon-based particles (hereinafter referred to a quantity of graphite particles surrounding a silicon-based particle) is 6 to 17:

A cross-section of the negative electrode was polished with Ar particles, then a SEM was used to photograph at least 30 silicon-based particles at a time among the silicon-based particles with a minimal distance of greater than or equal to about 6 μm from their edges to the current collector and the surface of the negative electrode, and a quantity of graphite particles present within a vertical distance of about 0 to 6 μm to an edge of each of the at least 30 silicon-based particles was recorded as N. Here, the quantity of graphite particles refers to a quantity of individual graphite particles, that is, a quantity of primary graphite particles. If an agglomerate of graphite particles was formed, the calculated quantity of graphite particles was the quantity of individual graphite particles in the agglomerate satisfying the above requirement, instead of considering the agglomerate as one particle.

A percentage of the silicon-based particles satisfying that N is 6 to 17 in the at least 30 silicon-based particles was calculated. If no more than 30 silicon-based particles were present in an observed region, another region was used for photographing. Each of the above N graphite particles may be entirely within the vertical distance of about 0 to 6 μm to respective edges of the at least 30 silicon-based particle, or some of the graphite particles may be entirely within the above range, while each of the other graphite particles is only partially within the above range.

The percentage by weight of each substance in the table below was calculated based on a total weight of the negative electrode active material.

II. Electrical Performance Test Method for a Negative Electrode Active Material

1. Button Battery Testing Method:

In a dry argon atmosphere, $LiPF_6$ with a concentration of about 1.15 mol/L was added into a solvent obtained by mixing propylene carbonate (PC), ethylene carbonate (EC) and diethyl carbonate (DEC) (at a weight ratio of about 1:1:1) and mixed uniformly, and then about 7.5 wt % of fluoroethylene carbonate (FEC) was added and mixed uniformly to obtain an electrolytic solution.

The negative electrode active material, conductive carbon black and the binder PAA (modified polyacrylic acid, PAA) obtained in the examples and comparative examples were added into deionized water at a weight ratio of about 80:10:10 and stirred to form a slurry. The slurry was applied with a scraper to form a coating with a thickness of about 100 μm, then dried in a vacuum drying oven at about 85° C. for about 12 hours and cut into a disc with a diameter of about 1 cm by using a punching machine in a dry environment. Then, in a glove box, the disc was assembled into a button battery with a metal lithium sheet as a counter electrode, a ceglard composite membrane as a separator and an added electrolytic solution. A LAND (LAND) battery tester was used to conduct a charge and discharge test on the battery to test a charge-discharge capacity of the battery.

Firstly, the battery was discharged to 0.005 V at 0.05 C, and after standing for 5 minutes, discharged to 0.005 V at 50 μA; after standing for 5 minutes once more, the battery was discharged to 0.005 V at 10 μA. An initial lithiation capacity of the material was obtained. Then, the battery was charged to 2 V at 0.1 C, and an initial delithiation capacity was obtained. Finally, initial efficiency of the material was obtained by dividing the initial delithiation capacity by the initial lithiation capacity.

2. Full Battery Test (1) Preparation of a Lithium-Ion Battery

Preparing a Positive Electrode $LiCoO_2$, conductive carbon black and polyvinylidene fluoride (PVDF) were stirred thoroughly and mixed uniformly at a weight ratio of about 95%:2.5%:2.5% in an N-methylpyrrolidone solvent system to prepare a positive electrode slurry. The prepared positive electrode slurry was applied on a positive electrode current collector aluminum foil, dried and cold-pressed to obtain a positive electrode.

Preparing a Negative Electrode

Graphite, the silicon-based negative electrode active material prepared according to examples and comparative examples, conductive agent (conductive carbon black, Super P®), and the binder PAA were mixed at a weight ratio of about 95%:1.2%:5%:3.8%, and with an appropriate amount of water added, kneaded at a solid content of about 30 wt % to 60 wt %. An appropriate amount of water was added to adjust the viscosity of the slurry to about 2000 to 3000 Pa·s to prepare a negative electrode slurry.

The prepared negative electrode slurry was applied on an aluminum foil of a negative electrode current collector, dried and cold-pressed to obtain a negative electrode.

Preparing an Electrolytic Solution

In a dry argon atmosphere, LiPF$_6$ with a concentration of about 1.15 mol/L was added into a solvent obtained by mixing propylene carbonate (PC), ethylene carbonate (EC) and diethyl carbonate (DEC) (at a weight ratio of about 1:1:1) and mixed uniformly, and then about 7.5 wt % of fluoroethylene carbonate (FEC) was added and mixed uniformly to obtain an electrolytic solution.

Preparing a Separator

A PE porous polymer film was used as a separator.

Preparing a Lithium-Ion Battery

The positive electrode, the separator and the negative electrode were stacked in order so that the separator is located between the positive electrode and the negative electrode to achieve a separation effect. Winding was performed to obtain a bare cell. The bare cell was put into an outer package, and packaged with the electrolytic solution injected. Then, after chemical conversion, degassing, trimming and other technological processes, a lithium-ion battery was obtained.

(2) Cycle Performance Test:

At a test temperature of 25° C./45° C., the battery was charged to 4.4 V at a constant current of 0.7 C, and constant-voltage charged to 0.025 C, followed by standing for 5 minutes, and then discharged to 3.0 V at 0.5 C. A capacity obtained in this step was an initial capacity. Then, a 0.7 C charge/0.5 C discharge cycle test was performed. A ratio of a capacity at each step to the initial capacity was calculated to obtain a capacity fade curve. The quantity of cycles when a capacity retention rate was 90% at 25° C. was recorded as room temperature cycle performance of the battery. The quantity of cycles when a capacity retention rate was 80% at 45° C. was recorded as high temperature cycle performance of the battery. The cycle performance of the material was compared by comparing the quantity of cycles in the above two situations.

(3) Discharge Rate Test:

At 25° C., the battery was discharged to 3.0 V at 0.2 C, followed by standing for 5 minutes, then charged to 4.45 V at 0.5 C, and constant-voltage charged to 0.05 C, followed by standing for 5 minutes. The discharge rate was adjusted and discharge tests were performed at 0.2 C, 0.5 C, 1 C, 1.5 C and 2.0 C respectively to obtain different discharge capacities. The capacity obtained at each rate was compared with the capacity obtained at 0.2 C. The rate performance was compared by comparing the ratios at 2 C and 0.2 C.

(4) Fully-Charged Battery Deformation Rate Test:

A thickness of a half-charged (state of charge (SOC) of 50%) fresh battery was tested with a spiral micrometer. Then, after 400 cycles, a thickness of the battery fully charged (SOC of 100%) was tested with the spiral micrometer and compared with the initial thickness of the half-charged (SOC of 50%) fresh battery to obtain a deformation rate of the fully-charged (SOC of 100%) battery.

III. Compositions and Performance Test Results of the Negative Electrode

1. Commercially available silicon oxide SiO$_x$ (0.5<x<1.5, Dv50=about 5.3 μm) and graphite particles were selected to be negative electrode active materials, and the negative electrodes in Examples 1 to 3 and Comparative Example 1 were prepared according to the above method.

Table 1-1 shows compositions of the negative electrodes in Examples 1 to 3 and Comparative Example 1.

TABLE 1-1

| Number | Quantity of graphite particles surrounding a SiO$_x$ particle (N) | Percentage of SiO$_x$ particles each satisfying that a quantity of surrounding graphite particles is N in a total quantity of SiO$_x$ particles | Average sphericity of graphite particles | Average sphericity of SiO$_x$ particles | Difference between average sphericities of SiO$_x$ particles and graphite particles | Negative electrode compacted density (g/cm$^3$) | Negative electrode gram capacity (mAh · g$^{-1}$) | Ratio of Dv50 of graphite particles and silicon-based particles |
|---|---|---|---|---|---|---|---|---|
| Example 1 | 8-14 | 70% | 0.68 | 0.92 | 0.24 | 1.75 | 501 | 2.52 |
| Example 2 | 11-17 | 70% | 0.68 | 0.92 | 0.24 | 1.75 | 498 | 1.7 |
| Example 3 | 6-12 | 70% | 0.68 | 0.92 | 0.24 | 1.75 | 503 | 3.7 |
| Comparative Example 1 | 18-22 | 70% | 0.68 | 0.92 | 0.24 | 1.75 | 503 | 1.3 |

*The gram capacity is a capacity obtained when a delithiation cut-off voltage is 2.0 V (the same applies below).

Table 1-2 shows compositions of the negative electrodes in Examples 4 to 6 and Comparative Example 2.

TABLE 1-2

| Number | Quantity of graphite particles surrounding a SiO$_x$ particle (N) | Percentage of SiO$_x$ particles each satisfying that a quantity of surrounding graphite particles is N in a total quantity of SiO$_x$ particles | Average sphericity of SiO$_x$ particles | Average sphericity of graphite particles | Difference between average sphericities of SiO$_x$ particles and graphite particles | Negative electrode compacted density (g/cm$^3$) | Negative electrode gram capacity (mAh · g$^{-1}$) | Ratio of Dv50 of graphite particles and silicon-based particles |
|---|---|---|---|---|---|---|---|---|
| Example 4 | 8-14 | 70% | 0.85 | 0.8 | 0.05 | 1.75 | 501 | 2.48 |
| Example 5 | 11-17 | 70% | 0.85 | 0.8 | 0.05 | 1.75 | 499 | 1.67 |
| Example 6 | 6-12 | 70% | 0.85 | 0.8 | 0.05 | 1.75 | 503 | 3.66 |
| Comparative Example 2 | 18-22 | 70% | 0.85 | 0.8 | 0.05 | 1.75 | 502 | 1.33 |

Table 1-3 shows compositions of the negative electrodes in Examples 7 to 9 and Comparative Example 3.

TABLE 1-3

| Number | Quantity of graphite particles surrounding a $SiO_x$ particle (N) | Percentage of $SiO_x$ particles each satisfying that a quantity of surrounding graphite particles is N in a total quantity of $SiO_x$ particles | Average sphericity of $SiO_x$ particles | Average sphericity of graphite particles | Difference between average sphericities of $SiO_x$ particles and graphite particles | Negative electrode compacted density (g/cm³) | Negative electrode gram capacity (mAh · g⁻¹) | Ratio of Dv50 of graphite particles and silicon-based particles |
|---|---|---|---|---|---|---|---|---|
| Example 7 | 8-14 | 70% | 0.92 | 0.57 | 0.35 | 1.75 | 503 | 2.51 |
| Example 8 | 11-17 | 70% | 0.92 | 0.57 | 0.35 | 1.75 | 497 | 1.72 |
| Example 9 | 6-12 | 70% | 0.92 | 0.57 | 0.35 | 1.75 | 502 | 3.71 |
| Comparative Example 3 | 18-22 | 70% | 0.92 | 0.57 | 0.35 | 1.75 | 501 | 1.28 |

Table 1-4 shows performance test results of lithium-ion batteries in Examples 1 to 9 and Comparative Examples 1 to 3.

TABLE 1-4

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 2 | 90.1% | 87.2% | 7.4% | 8.2% | 87.1% |
| Example 3 | 87.6% | 84.4% | 8.2% | 9.3% | 85.1% |
| Comparative Example 1 | 83.6% | 81.4% | 9.1% | 10.4% | 85.1% |
| Example 4 | 88.1% | 85.8% | 8.4% | 8.6% | 85.7% |
| Example 5 | 86.4% | 84.7% | 8.7% | 8.9% | 84.1% |
| Example 6 | 85.1% | 84.0% | 9.1% | 9.4% | 84.7% |
| Comparative Example 2 | 83.6% | 81.4% | 10.1% | 10.5% | 82.1% |
| Example 7 | 87.1% | 84.9% | 8.9% | 8.8% | 85.1% |
| Example 8 | 85.4% | 83.7% | 9.3% | 9.0% | 83.1% |
| Example 9 | 84.1% | 83.0% | 9.7% | 9.9% | 82.7% |
| Comparative Example 3 | 81.6% | 81.4% | 11.1% | 11.5% | 80.1% |

It can be seen from the test results of Examples 1 to 3 and Comparative Example 1 that, for the lithium-ion battery prepared by using the $SiO_x$ particles satisfying that the quantity N of graphite particles is 6 to 17, its capacity retention rate was greater than that of the lithium-ion battery prepared by using the $SiO_x$ particles satisfying that N is 18 to 22, and its deformation rate was less than that of the lithium-ion battery prepared by using the $SiO_x$ particles satisfying that N is 18 to 22.

The quantity of graphite particles surrounding a $SiO_x$ particle in the negative electrode reflected a corresponding mapping relationship between the particle sizes of the graphite particles and $SiO_x$ particles. For the same $SiO_x$ particle, if the particle sizes of graphite were greater, a quantity of graphite particles surrounding the $SiO_x$ particles within a given range was less. On the contrary, if the particle sizes of graphite were smaller, a quantity of graphite particles surrounding the $SiO_x$ particle within a given range was greater. When there were excessive graphite particles, it was difficult for the $SiO_x$ particles to fill in voids formed by the graphite particles stacked on each other, so a physical staggering effect was unable to occur, and a maximum compacted density of the negative electrode was reduced. Therefore, a contact area between the negative electrode active material and the electrolytic solution was increased, leading to the generation of more solid electrolyte interphase (solid electrolyte interphase, SEI) films, and reducing initial efficiency and a capacity retention rate of the material. The test results of Examples 4 to 6 and Comparative Example 2, and the test results of Examples 7 to 9 and Comparative Example 3 further indicated that in a case that differences between the average sphericities of the graphite particles and $SiO_x$ particles were different, both a capacity retention rate and deformation resistance capability of the lithium-ion battery prepared by using $SiO_x$ particles satisfying that a quantity N of graphite particles was 6 to 17 were better than the lithium-ion battery prepared by using $SiO_x$ particles satisfying that N was 18 to 22.

2. The negative electrodes in Examples 10 to 12 and Comparative Example 4 were prepared in the following method:

(1) performing mechanical dry mixing and ball mill mixing for silicon dioxide and metal silicon powder at a molar ratio of 1:1 to obtain a mixed material;

(2) heating the mixed material in an $Ar_2$ atmosphere at a pressure ranging from about $10^{-3}$ to $10^{-1}$ kPa and at a temperature ranging from about 1100 to 1550° C. for about 0.5 to 24 hours to obtain a gas;

(3) condensing the gas to obtain a solid;

(4) crushing and sieving the solid;

(5) applying heat treatment to the solid at a temperature ranging from about 400 to 1200° C. for about 1 to 24 hours and cooling the heat-treated solid to obtain the silicon oxide $SiO_x$ as a silicon-based negative electrode active material; and (6) preparing the negative electrodes in Examples 10 to 12 and Comparative Example 4 in the above method, where a percentage of the silicon-based particles each surrounded by 8 to 14 graphite particles in a total quantity of silicon-based particles was 70%, and the average sphericities of the silicon-based particles and the graphite particles were about 0.92 and about 0.68 respectively.

Table 2-1 shows specific process parameters in steps (1) to (5).

TABLE 2-1

| Number | SiO$_2$:Si (molar ratio) | Pressure (Pa) | Heating temperature (° C.) | Heating time (h) | Classification treatment | Heat treatment after classification |
|---|---|---|---|---|---|---|
| Example 10 | 1:1 | 10 | 1350 | 20 | Jet crushing + multi-stage classification | / |
| Example 11 | 1:1 | 10 | 1350 | 20 | Jet crushing + multi-stage classification | 600° C., 2 h |
| Example 12 | 1:1 | 10 | 1350 | 20 | Jet crushing + multi-stage classification | 800° C., 2 h |
| Comparative Example 4 | 1:1 | 10 | 1350 | 20 | Jet crushing + multi-stage classification | 1000° C., 2 h |

Table 2-2 shows performance parameters of the silicon-based negative electrode active materials and graphite particles in Examples 10 to 12 and Comparative Example 4.

TABLE 2-2

| | $I_2/I_1$ value | $D_v50$ (μm) | Specific surface area (m$^2$·g$^{-1}$) | Gram capacity * (mAh·g$^{-1}$) | Initial efficiency |
|---|---|---|---|---|---|
| Graphite particles in Examples 10 to 12 and Comparative Example 4 | — | 14.1 | 1.06 | 355 | 92.6% |
| Example 10 | 0.41 | 5.6 | 1.28 | 1682 | 69.4% |
| Example 11 | 0.64 | 5.6 | 1.31 | 1672 | 68.7% |
| Example 12 | 1 | 5.6 | 1.28 | 1687 | 68.9% |
| Comparative Example 4 | 2.5 | 5.6 | 1.29 | 1679 | 69.6% |

Table 2-3 shows performance test results of lithium-ion batteries in Examples 10 to 12 and Comparative Example 4.

TABLE 2-3

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 10 | 92.5% | 89.5% | 6.2% | 7.4% | 86.7% |
| Example 11 | 91.1% | 87.2% | 7.2% | 8.3% | 86.1% |
| Example 12 | 88.6% | 84.4% | 8.4% | 9.2% | 85.1% |
| Comparative Example 4 | 83.7% | 80.4% | 9.5% | 10.8% | 83.6% |

It can be seen from the performance test results of Examples 10 to 12 and Comparative Example 4 that, in a case also satisfying that about 70% of the SiO$_x$ particles each was surrounded by 8 to 14 graphite particles, cycle performance, deformation resistance, and rate performance of the lithium-ion battery prepared by selecting a silicon oxide SiO$_x$ satisfying about 0<$I_2/I_1$≤about 1 were better than those of the lithium-ion battery prepared by using a silicon oxide with about 1<$I_2/I_1$.

3. The negative electrodes in Examples 13 to 15 and Comparative Examples 5 and 6 were prepared in the following method:

(1) obtaining the silicon-based negative electrode active material in Examples 13 to 15 and Comparative Examples 5 and 6 by sieving and classifying commercially available silicon oxide SiO$_x$; and (2) preparing the negative electrodes in Examples 13 to 15 and Comparative Examples 5 and 6 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 3-1 shows performance parameters of the silicon-based negative electrode active materials in Examples 13 to 15 and Comparative Examples 5 and 6.

TABLE 3-1

| Number | Dn10/Dv50 | $D_v50$ (μm) | Specific surface area (m$^2$·g$^{-1}$) | Gram capacity * (mAh·g$^{-1}$) | Initial efficiency |
|---|---|---|---|---|---|
| Example 13 | 0.3 | 5.5 | 1.56 | 1680 | 68.9% |
| Example 14 | 0.5 | 5.6 | 1.42 | 1678 | 69.2% |
| Example 15 | 0.6 | 5.6 | 1.28 | 1682 | 69.4% |
| Comparative Example 5 | 0.05 | 5.4 | 2.29 | 1676 | 68.6% |
| Comparative Example 6 | 0.8 | 5.8 | 1.1 | 1675 | 68.9% |

Table 3-2 shows performance test results of lithium-ion batteries prepared by using the negative electrodes in Examples 13 to 15 and Comparative Examples 5 and 6.

TABLE 3-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 13 | 88.5% | 84.5% | 7.2% | 7.8% | 86.7% |
| Example 14 | 91.1% | 87.2% | 6.8% | 7.5% | 86.1% |

TABLE 3-2-continued

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 15 | 92.5% | 89.5% | 6.2% | 7.4% | 86.7% |
| Comparative Example 5 | 83.7% | 80.4% | 9.5% | 10.8% | 86.6% |
| Comparative Example 6 | 84.1% | 81.4% | 8.8% | 9.8% | 86.4% |

It can be seen from the performance test results of Examples 13 to 15 and Comparative Examples 5 and 6 that, in a case also satisfying that about 70% of the $SiO_x$ particles each was surrounded by 8 to 14 graphite particles, cycle performance, deformation resistance capability, and rate performance of the lithium-ion battery prepared by selecting a silicon oxide satisfying about 0.3≤Dn10/Dv50≤about 0.6 were better than those of the lithium-ion battery prepared by using a silicon oxide with Dn10/Dv50<about 0.3 or about 0.6<Dn10/Dv50.

4. The negative electrodes in Examples 16 to 19 were prepared in the following method:

(1) adding a commercially available silicon oxide $SiO_x$ (0.5<x<1.5, Dv50=about 5 μm), a carbon precursor, and an oxide precursor $MeT_n$ into about 150 mL of ethanol and about 1.47 mL of deionized water, and stirring for about 4 hours until a uniform suspension was formed;

(2) spray drying (with an inlet temperature of about 220° C. and an outlet temperature of about 110° C.) the suspension to obtain powder;

(3) sintering the powder at a temperature of about 250 to 900° C. for about 0.5 to 24 hours to obtain silicon oxide with an oxide $MeO_y$ layer on the surface as the silicon-based negative electrode active material; and (4) preparing the negative electrodes in Examples 16 to 19 in the above method, where a percentage of the silicon-based particles each of which was surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 4-1 shows process conditions for preparing the silicon oxide $SiO_x$ with an oxide $MeO_y$ coating layer in Examples 16 to 19.

TABLE 4-1

| Number | Commercially available silicon oxide $SiO_x$ | Carbon precursor | Oxide precursor $MeT_n$ | Sintering process |
|---|---|---|---|---|
| Example 16 | 100 g | 2.21 g of polyvinylpyrrolidone | 1 g of aluminium isopropoxide | $N_2$ flow: 1.5 L/min, heating up to 600° C. by rising 3° C. per minute, keeping the temperature for 2 hours |
| Example 17 | 100 g | 2.21 g of polyvinylpyrrolidone | 1 g of titanium tetraisopropanolate | $N_2$ flow: 1.5 L/min, heating up to 600° C. by rising 3° C. per minute, keeping the temperature for 2 hours |
| Example 18 | 100 g | 2.21 g of polyvinylpyrrolidone | 0.5 g of titanium tetraisopropanolate + 0.5 g of aluminium isopropoxide | $N_2$ flow: 1.5 L/min, heating up to 600° C. by rising 3° C. per minute, keeping the temperature for 2 hours |
| Example 19 | 100 g | 2.21 g of polyvinylpyrrolidone | — | $N_2$ flow: 1.5 L/min, heating up to 600° C. by rising 3° C. per minute, keeping the temperature for 2 hours |

"—" indicates that the substance is not added.

Table 4-2 shows compositions and performance parameters of the silicon-based negative electrode active materials in Examples 1, and 16 to 19.

TABLE 4-2

| Number | Types of metal elements | Metal content (wt %) | Carbon content in oxide MeO$_y$ layer (wt %) | Specific surface area (m$^2$/g) | Gram capacity * (mAh · g$^{-1}$) | Initial efficiency |
|---|---|---|---|---|---|---|
| Example 1 | — | — | — | 1.28 | 1682 | 69.4% |
| Example 16 | Al | 0.125 | 0.300 | 1.45 | 1682 | 68.6% |
| Example 17 | Ti | 0.125 | 0.300 | 1.47 | 1678 | 74.0% |
| Example 18 | Al + Ti | 0.125 | 0.300 | 1.53 | 1682 | 70.3% |
| Example 19 | Al | 0.000 | 0.300 | 1.38 | 1690 | 74.2% |

"—" indicates that the substance is not added.

Table 4-3 shows performance test results of lithium-ion batteries prepared by using the negative electrodes in Examples 1, and 16 to 19.

TABLE 4-3

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 16 | 94.0% | 91.7% | 5.6% | 6.8% | 84.4% |
| Example 17 | 93.4% | 90.6% | 6.7% | 7.6% | 85.4% |
| Example 18 | 93.6% | 90.8% | 6.4% | 7.6% | 85.9% |
| Example 19 | 93.1% | 89.9% | 6.8% | 7.7% | 87.7% |

It can be seen from the test results of Examples 1, and 16 to 19 that, in a case also satisfying that about 70% of the SiO$_x$ particles each was surrounded by 8 to 14 graphite particles, coating the silicon oxide with an oxide MeO$_y$ layer may further improve cycle performance and/or rate performance and deformation resistance capability of the lithium-ion battery.

5. The negative electrodes in Examples 20 to 25 were prepared in the following method:

(1) dispersing the carbon material (single-wall carbon nanotubes (SCNT) and/or multi-wall carbon nanotubes (MCNT)) and polymer in water at a high speed for about 12 hours to obtain a uniformly mixed slurry;

(2) adding a commercially available silicon oxide SiO$_x$ (0.5<x<1.5, Dv50=about 5 μm) to the uniformly mixed slurry obtained in (1) and stirring them for about 4 hours to obtain a uniformly mixed dispersion;

(3) spray drying (with an inlet temperature of about 200° C. and an outlet temperature of about 110° C.) the dispersion to obtain powder as the silicon-based negative electrode active material; and (4) preparing the negative electrodes in Examples 20 to 25 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 5-1 shows compositions of the silicon oxide SiO$_x$ with a polymer coating layer in Examples 20 to 25.

TABLE 5-1

| Number | Type of CNT | CNT content (wt %) | Type of polymer | Polymer content (wt %) |
|---|---|---|---|---|
| Example 1 | — | — | — | — |
| Example 20 | SCNT | 0.10 | CMC-Na | 0.15 |
| Example 21 | MCNT | 0.10 | CMC-Na | 0.15 |
| Example 22 | SCNT:MCNT = 1:1 | 0.10 | CMC-Na | 0.15 |
| Example 23 | SCNT | 0.01 | CMC-Na | 0.15 |
| Example 24 | SCNT | 0.50 | CMC-Na | 0.15 |
| Example 25 | SCNT | 0.10 | CMC-Na | 0.025 |

"—" indicates that the substance is not added.

The abbreviations in Table 5-1 are explained as follows:
SCNT: single-wall carbon nanotube
MCNT: multi-wall carbon nanotube
CMC-Na: sodium carboxymethyl cellulose
PVP: polyvinylpyrrolidone
PVDF: polyvinylidene fluoride
PAANa: sodium polyacrylate Table 5-2 shows performance test results of lithium-ion batteries prepared by using the negative electrodes in Examples 1, and 20 to 25.

TABLE 5-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 20 | 94.6% | 92.4% | 6.3% | 7.5% | 87.6% |
| Example 21 | 93.2% | 90.4% | 6.4% | 7.5% | 87.6% |
| Example 22 | 93.7% | 90.8% | 6.4% | 7.8% | 87.3% |

TABLE 5-2-continued

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 23 | 94.6% | 92.4% | 6.3% | 7.5% | 87.6% |
| Example 24 | 94.4% | 92.0% | 6.7% | 7.8% | 88.6% |
| Example 25 | 93.2% | 90.2% | 6.6% | 7.7% | 87.6% |

It can be seen from the test results of Examples 1, and 20 to 25 that, in a case also satisfying that each of the $SiO_x$ particles was surrounded by 8 to 14 graphite particles, coating the silicon oxide with a polymer layer containing carbon nanotubes may further improve cycle performance and/or rate performance and deformation resistance capability of the lithium-ion battery.

6. The negative electrode active materials in Examples 26 to 28 and Comparative Examples 7 and 8 were prepared by:

(1) preparing a silicon-based negative electrode active material with an $I_2/I_1$ value of about 0.5, where the preparation method was similar to that in Example 11 except that the heat treatment after classification was performed at a temperature of about 500° C. for about 2 hours;

(2) obtaining the silicon-based negative electrode active material in Examples 26 to 28 and Comparative Examples 7 and 8 through further classification treatment; and (3) preparing the negative electrodes in Examples 26 to 28 and Comparative Examples 7 and 8 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 6-1 shows performance parameters of the silicon-based negative electrode active materials in Examples 26 to 28 and Comparative Examples 7 and 8.

TABLE 6-1

| Number | $I_2/I_1$ value | Dn10/Dv50 value | Specific surface area $(m^2 \cdot g^{-1})$ | Gram capacity * $(mAh \cdot g^{-1})$ |
|---|---|---|---|---|
| Example 26 | 0.5 | 0.3 | 1.56 | 1678 |
| Example 27 | 0.5 | 0.5 | 1.26 | 1678 |
| Example 28 | 0.5 | 0.6 | 1.23 | 1680 |
| Comparative Example 7 | 0.5 | 0.05 | 2.29 | 1673 |
| Comparative Example 8 | 0.5 | 0.8 | 1.21 | 1674 |

Table 6-2 shows performance test results of lithium-ion batteries prepared by using the negative electrodes in Examples 26 to 28 and Comparative Examples 7 and 8.

TABLE 6-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 26 | 91.2% | 86.1% | 7.1% | 8.4% | 85.7% |
| Example 27 | 91.6% | 87.6% | 6.8% | 8.2% | 86.4% |
| Example 28 | 92.3% | 88.9% | 6.4% | 7.9% | 87.7% |
| Comparative Example 7 | 83.7% | 80.4% | 9.5% | 10.8% | 84.6% |
| Comparative Example 8 | 85.7% | 83.4% | 8.5% | 9.8% | 84.6% |

It can be seen from the performance test results of Examples 26 to 28 and Comparative Examples 7 and 8 that, in a case also satisfying that about 70% of the $SiO_x$ particles each was surrounded by 8 to 14 graphite particles, and about $0<I_2/I_1 \le$ about 1, cycle performance, deformation resistance capability, and rate performance of the lithium-ion battery with the negative electrode prepared by selecting a silicon oxide satisfying about 0.3≤Dn10/Dv50≤about 0.6 were better than those of the lithium-ion battery with the negative electrode prepared by using a silicon oxide with Dn10/Dv50<about 0.3 or about 0.6<Dn10/Dv50.

7. The negative electrodes in Examples 29 to 32 were prepared in the following method:

(1) obtaining the silicon-based negative electrode active material in Examples 29 to 32 by further coating the silicon-based negative electrode active material in Example 11 with an oxide $MeO_y$ coating layer, where the coating methods in Examples 29 to 32 were the same as the coating methods in Examples 16 to 19; and (2) preparing the negative electrodes in Examples 29 to 32 in the above method, where a percentage of the silicon-based particles each surrounded by 8 to 14 graphite particles in a total quantity of silicon-based particles was 70%, and the average sphericities of the silicon-based particles and the graphite particles were about 0.92 and about 0.68 respectively. The graphite particles were the same as the graphite particles in Table 2-2.

Table 7-1 shows compositions and performance parameters of the silicon-based negative electrode active materials in Examples 11, and 29 to 32.

TABLE 7-1

| Number | Types of metal elements | Metal element content (wt %) | Carbon content in oxide $MeO_y$ layer (wt %) | Specific surface area $(m^2/g)$ | Gram capacity * $(mAh \cdot g^{-1})$ | Initial efficiency |
|---|---|---|---|---|---|---|
| Example 11 | — | — | 0.030 | 1.29 | 1675 | 68.2% |
| Example 29 | Al | 0.125 | 0.300 | 1.42 | 1677 | 68.7% |

TABLE 7-1-continued

| Number | Types of metal elements | Metal element content (wt %) | Carbon content in oxide MeO$_y$ layer (wt %) | Specific surface area (m$^2$/g) | Gram capacity * (mAh · g$^{-1}$) | Initial efficiency |
|---|---|---|---|---|---|---|
| Example 30 | Ti | 0.125 | 0.300 | 1.47 | 1664 | 73.1% |
| Example 31 | Al + Ti | 0.125 | 0.300 | 1.53 | 1675 | 70.4% |
| Example 32 | Al | 0.000 | 0.300 | 1.35 | 1681 | 74.3% |

"—" indicates that the substance is not added.

Table 7-2 shows performance test results of lithium-ion batteries prepared by using the negative electrodes in Examples 11, and 29 to 32.

TABLE 7-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 11 | 91.1% | 87.2% | 7.2% | 8.3% | 86.1% |
| Example 29 | 93.8% | 91.4% | 5.9% | 6.9% | 84.2% |
| Example 30 | 93.0% | 90.2% | 6.9% | 7.9% | 85.1% |
| Example 31 | 93.6% | 90.7% | 6.7% | 7.8% | 85.3% |
| Example 32 | 92.7% | 89.4% | 7.0% | 7.9% | 87.2% |

It can be seen from the test results of Examples 11, and 29 to 32 that, in a case also satisfying that about 70% of the SiO$_x$ particles each was surrounded by 8 to 14 graphite particles, and about 0<I$_2$/I$_1$<about 1, coating the silicon oxide with an oxide MeO$_y$ layer may further improve cycle performance and/or rate performance and deformation resistance capability of the lithium-ion battery.

8. The negative electrodes in Examples 33 to 40 were prepared in the following method:

(1) obtaining the silicon-based negative electrode active material in Examples 33 to 40 by further coating the silicon-based negative electrode active material in Example 11 with a polymer layer containing carbon nanotubes, where the coating methods in Examples 33 to 40 were the same as the coating methods in Examples 20 to 25; and (2) preparing the negative electrodes in Examples 33 to 40 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 8-1 shows compositions of the silicon-based negative electrode active materials with a polymer coating layer in Examples 33 to 40.

TABLE 8-1

| Number | Type of CNT | CNT content (wt %) | Type of polymer | Polymer content (wt %) |
|---|---|---|---|---|
| Example 11 | — | — | — | — |
| Example 33 | SCNT | 0.10 | CMC-Na | 0.15 |
| Example 34 | MCNT | 0.10 | CMC-Na | 0.15 |
| Example 35 | SCNT:MCNT = 1:1 | 0.10 | CMC-Na | 0.15 |
| Example 36 | SCNT | 0.01 | CMC-Na | 0.15 |
| Example 37 | SCNT | 0.50 | CMC-Na | 0.15 |
| Example 38 | SCNT | 0.10 | PVP | 0.15 |
| Example 39 | SCNT | 0.10 | PAANa | 0.15 |
| Example 40 | SCNT | 0.10 | CMC-Na | 0.025 |

"—" indicates that the substance is not added.

Table 8-2 shows performance test results of lithium-ion batteries prepared by using the negative electrodes in Examples 11, and 33 to 40.

TABLE 8-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 11 | 91.1% | 87.2% | 7.2% | 8.3% | 86.1% |
| Example 33 | 93.1% | 91.4% | 6.7% | 7.8% | 87.6% |
| Example 34 | 92.3% | 89.9% | 6.7% | 8.4% | 87.0% |
| Example 35 | 92.5% | 89.9% | 6.9% | 8.2% | 87.3% |
| Example 36 | 92.8% | 90.4% | 7.3% | 8.5% | 87.4% |
| Example 37 | 92.6% | 91.0% | 7.4% | 8.3% | 87.9% |
| Example 38 | 92.3% | 89.4% | 6.9% | 8.2% | 87.4% |
| Example 39 | 92.7% | 90.0% | 7.0% | 8.2% | 86.4% |
| Example 40 | 92.5% | 90.1% | 7.1% | 8.2% | 87.6% |

It can be seen from the test results of Examples 11, and 33 to 40 that, in a case also satisfying that about 70% of the SiO$_x$ particles each was surrounded by 8 to 14 graphite particles, and about 0<I$_2$/I$_1$≤about 1, coating the silicon oxide with a polymer layer containing carbon nanotubes may further improve cycle performance and/or rate performance and deformation resistance capability of the lithium-ion battery.

9. The negative electrodes in Examples 41 to 45 were prepared in the following method:

(1) obtaining the silicon-based negative electrode active material in Examples 41 to 45 by further coating the silicon-based negative electrode active material in Example 14 with an oxide $MeO_y$ coating layer, where the coating methods in Examples 41 to 45 were the same as the coating methods in Examples 16 to 19; and (2) preparing the negative electrodes in Examples 41 to 45 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 9-1 shows compositions and performance parameters of the silicon-based negative electrode active materials in Examples 14, and 41 to 45.

TABLE 9-1

| Number | Types of metal elements | Metal element content (wt %) | Carbon content in oxide $MeO_y$ layer (wt %) | Specific surface area (m²/g) | Gram capacity * (mAh · g⁻¹) | Initial efficiency |
|---|---|---|---|---|---|---|
| Example 14 | — | — | 0.030 | 1.28 | 1682 | 69.4% |
| Example 41 | Al | 0.125 | 0.300 | 1.44 | 1681 | 68.4% |
| Example 42 | Ti | 0.125 | 0.300 | 1.47 | 1677 | 74.1% |
| Example 43 | Al + Ti | 0.125 | 0.300 | 1.54 | 1680 | 70.2% |
| Example 44 | Al | 0.000 | 0.300 | 1.28 | 1688 | 74.1% |
| Example 45 | Al | 0.500 | 0.300 | 1.78 | 1660 | 68.1% |

"—" indicates that the substance is not added.

Table 9-2 shows performance test results of lithium-ion batteries prepared by using the negative electrodes in Examples 14, and 41 to 45.

TABLE 9-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 14 | 91.1% | 87.2% | 6.8% | 7.5% | 86.1% |
| Example 41 | 93.0% | 89.7% | 6.1% | 6.9% | 84.2% |
| Example 42 | 92.4% | 88.6% | 7.2% | 7.7% | 85.4% |
| Example 43 | 92.6% | 88.8% | 6.9% | 7.8% | 85.3% |
| Example 44 | 92.1% | 87.9% | 7.2% | 7.8% | 87.4% |
| Example 45 | 93.6% | 90.1% | 5.8% | 6.4% | 82.1% |

It can be seen from the performance test results of Examples 14, and 41 to 45 that, in a case also satisfying that about 70% of the $SiO_x$ particles each was surrounded by 8 to 14 graphite particles, and about 0.3≤Dn10/Dv50≤about 0.6, coating the silicon oxide with an oxide $MeO_y$ layer may further improve cycle performance and/or rate performance and deformation resistance capability of the lithium-ion battery.

10. The negative electrodes in Examples 46 to 52 were prepared in the following method:

(1) obtaining the silicon-based negative electrode active material in Examples 46 to 52 by further polymer the silicon-based negative electrode active material in Example 14 with a coating layer containing carbon nanotubes, where the coating methods in Examples 46 to 52 were the same as the coating methods in Examples 20 to 25; and (2) preparing the negative electrodes in Examples 46 to 52 in the above method, where a percentage of silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 10-1 shows compositions of the silicon-based negative electrode active materials in Examples 14, and 46 to 52.

TABLE 10-1

| Number | Type of CNT | CNT content (wt %) | Type of polymer | Polymer content (wt %) |
|---|---|---|---|---|
| Example 14 | — | — | — | — |
| Example 46 | SCNT | 0.10 | CMC-Na | 0.15 |
| Example 47 | MCNT | 0.10 | CMC-Na | 0.15 |
| Example 48 | SCNT:MCNT = 1:1 | 0.10 | CMC-Na | 0.15 |
| Example 49 | SCNT | 0.10 | PVP | 0.15 |
| Example 50 | SCNT | 0.10 | PVDF | 0.15 |
| Example 51 | SCNT | 0.10 | PAANa | 0.15 |
| Example 52 | SCNT | 0.10 | CMC-Na | 0.025 |

"—" indicates that the substance is not added.

Table 10-2 shows performance test results of lithium-ion batteries prepared by using the negative electrodes in Examples 14, and 46 to 52.

TABLE 10-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 14 | 91.1% | 87.2% | 6.8% | 7.5% | 86.1% |
| Example 46 | 93.0% | 91.3% | 6.9% | 7.7% | 87.7% |
| Example 47 | 92.2% | 89.8% | 6.8% | 8.3% | 87.2% |
| Example 48 | 92.6% | 89.8% | 6.9% | 8.1% | 87.1% |

TABLE 10-2-continued

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 49 | 92.4% | 89.2% | 6.8% | 8.3% | 87.2% |
| Example 50 | 92.1% | 89.4% | 7.0% | 8.2% | 85.3% |
| Example 51 | 92.5% | 90.2% | 7.1% | 8.1% | 86.5% |
| Example 52 | 92.1% | 90.0% | 7.2% | 8.3% | 87.5% |

It can be seen from the test results of Examples 14, and 46 to 52 that, in a case also satisfying that about 70% of the $SiO_x$ particles each was surrounded by 8 to 14 graphite particles, and about 0.3≤Dn10/Dv50≤about 0.6, coating the silicon oxide with a polymer layer containing carbon nanotubes may further improve cycle performance and/or rate performance and deformation resistance capability of the lithium-ion battery.

11. The negative electrodes in Examples 53 to 62 were prepared in the following method:

(1) obtaining the silicon-based negative electrode active material in Examples 53 to 62 by further coating the silicon-based negative electrode active material in Example 16 with a polymer layer containing carbon nanotubes, where the coating methods in Examples 53 to 62 were the same as the coating methods in Examples 46 to 52; and (2) preparing the negative electrodes in Examples 53 to 62 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 11-1 shows compositions of the silicon-based negative electrode active materials in Examples 16, and 53 to 62.

TABLE 11-1

| Number | Type of CNT | CNT content (wt %) | Type of polymer | Polymer content (wt %) |
|---|---|---|---|---|
| Example 16 | — | — | — | — |
| Example 53 | SCNT | 0.10 | CMC-Na | 0.15 |
| Example 54 | MCNT | 0.10 | CMC-Na | 0.15 |
| Example 55 | SCNT:MCNT = 1:1 | 0.10 | CMC-Na | 0.15 |
| Example 56 | SCNT | 0.01 | CMC-Na | 0.15 |
| Example 57 | SCNT | 0.50 | CMC-Na | 0.15 |
| Example 58 | SCNT | 0.10 | PVP | 0.15 |
| Example 59 | SCNT | 0.10 | PVDF | 0.15 |
| Example 60 | SCNT | 0.10 | PAANa | 0.15 |
| Example 61 | SCNT | 0.10 | CMC-Na | 0.4 |
| Example 62 | SCNT | 0.10 | CMC-Na | 0.025 |

"—" indicates that the substance is not added.

Table 11-2 shows performance test results of lithium-ion batteries prepared by using the negative electrodes in Examples 16, and 53 to 62.

TABLE 11-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 16 | 94.0% | 91.7% | 5.6% | 6.8% | 84.4% |
| Example 53 | 96.0% | 94.3% | 5.5% | 7.1% | 84.6% |
| Example 54 | 95.2% | 92.8% | 5.6% | 7.5% | 84.5% |
| Example 55 | 95.6% | 92.8% | 5.7% | 7.6% | 84.3% |
| Example 56 | 95.5% | 93.3% | 6.4% | 7.4% | 85.3% |
| Example 57 | 95.4% | 93.1% | 6.5% | 7.6% | 85.7% |
| Example 58 | 95.4% | 92.2% | 5.8% | 7.7% | 84.2% |
| Example 59 | 95.1% | 92.1% | 6.0% | 7.5% | 85.3% |
| Example 60 | 95.5% | 92.8% | 6.1% | 7.7% | 84.5% |
| Example 61 | 95.3% | 92.1% | 6.3% | 7.3% | 82.4% |
| Example 62 | 95.1% | 92.0% | 6.2% | 7.8% | 85.5% |

It can be seen from the test results of Examples 16, and 53 to 62 that, in a case also satisfying that about 70% of the $SiO_x$ particles each was surrounded by 8 to 14 graphite particles, further coating the silicon oxide having an oxide $MeO_y$ layer on the surface with a polymer layer containing carbon nanotubes may further improve cycle performance and/or rate performance and deformation resistance capability of the lithium-ion battery.

12. The negative electrodes in Examples 63 to 67 were prepared in the following method:

(1) obtaining the silicon-based negative electrode active material in Example 63 to 67 by further coating the silicon-based negative electrode active material in Example 27 with an oxide $MeO_y$ coating layer, where the coating methods in Examples 63 to 67 were the same as the coating methods in Examples 16 to 19; and (2) preparing the negative electrodes in Examples 63 to 67 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 12-1 shows compositions and performance parameters of the silicon-based negative electrode active materials in Examples 27, and 63 to 67.

TABLE 12-1

| Number | Types of metal elements | Metal element content (wt %) | Carbon content in oxide MeO$_y$ layer (wt %) | Specific surface area (m$^2$/g) | Gram capacity * (mAh · g$^{-1}$) | Initial efficiency |
|---|---|---|---|---|---|---|
| Example 27 | — | — | 0.030 | 1.28 | 1682 | 69.4% |
| Example 63 | Al | 0.125 | 0.300 | 1.45 | 1681 | 68.4% |
| Example 64 | Ti | 0.125 | 0.300 | 1.47 | 1677 | 74.1% |
| Example 65 | Al + Ti | 0.125 | 0.300 | 1.53 | 1680 | 70.2% |
| Example 66 | Al | 0.000 | 0.300 | 1.38 | 1688 | 74.1% |
| Example 67 | Al | 0.500 | 0.300 | 1.98 | 1660 | 68.1% |

"—" indicates that the substance is not added.

Table 12-2 shows performance test results of lithium-ion batteries prepared by using the negative electrodes in Examples 27, and 63 to 67.

TABLE 12-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 27 | 92.1% | 88.6% | 6.7% | 7.8% | 85.4% |
| Example 63 | 94.0% | 90.7% | 6.1% | 6.9% | 84.2% |
| Example 64 | 93.4% | 89.6% | 7.2% | 7.7% | 85.4% |
| Example 65 | 93.6% | 89.8% | 6.9% | 7.8% | 85.3% |
| Example 66 | 93.1% | 88.9% | 7.2% | 7.8% | 87.4% |
| Example 67 | 94.6% | 91.1% | 5.8% | 6.4% | 82.1% |

It can be seen from the performance test results of Examples 27, and 63 to 67 that, in a case also satisfying that about 70% of the SiO$_x$ particles each was surrounded by 8 to 14 graphite particles, about 0<I$_2$/I$_1$≤about 1, and about 0.3≤Dn10/Dv50≤about 0.6, coating the silicon oxide with an oxide MeO$_y$ layer may further improve cycle performance and/or rate performance and deformation resistance capability of the lithium-ion battery.

13. The negative electrodes in Examples 68 to 77 were prepared in the following method:

(1) obtaining the silicon-based negative electrode active material of Example 68 to 77 by further coating the silicon-based negative electrode active material in Example 27 with a polymer layer containing carbon nanotubes, where the coating methods in Examples 68 to 77 were the same as the coating methods in Examples 20 to 25; and (2) preparing the negative electrodes in Examples 68 to 77 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 13-1 shows compositions of the silicon-based negative electrode active materials in Examples 27, and 68 to 77.

TABLE 13-1

| Number | Type of CNT | CNT content (wt %) | Type of polymer | Polymer content (wt %) |
|---|---|---|---|---|
| Example 27 | — | — | — | — |
| Example 68 | SCNT | 0.10 | CMC-Na | 0.15 |
| Example 69 | MCNT | 0.10 | CMC-Na | 0.15 |
| Example 70 | SCNT:MCNT = 1:1 | 0.10 | CMC-Na | 0.15 |
| Example 71 | SCNT | 0.01 | CMC-Na | 0.15 |
| Example 72 | SCNT | 0.50 | CMC-Na | 0.15 |
| Example 73 | SCNT | 0.10 | PVP | 0.15 |
| Example 74 | SCNT | 0.10 | PVDF | 0.15 |
| Example 75 | SCNT | 0.10 | PAANa | 0.15 |
| Example 76 | SCNT | 0.10 | CMC-Na | 0.4 |
| Example 77 | SCNT | 0.10 | CMC-Na | 0.025 |

"—" indicates that the substance is not added.

Table 13-2 shows performance test results of lithium-ion batteries prepared by using the negative electrodes in Examples 27, and 68 to 77.

TABLE 13-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 27 | 92.1% | 88.6% | 6.7% | 7.8% | 85.4% |
| Example 68 | 94.0% | 91.3% | 5.5% | 8.1% | 84.6% |
| Example 69 | 93.1% | 89.9% | 5.6% | 8.5% | 84.3% |
| Example 70 | 93.6% | 89.8% | 5.7% | 8.6% | 84.1% |
| Example 71 | 93.5% | 90.4% | 6.4% | 8.9% | 85.3% |
| Example 72 | 93.4% | 90.1% | 6.5% | 9.1% | 85.6% |
| Example 73 | 93.3% | 89.2% | 5.8% | 8.7% | 84.1% |
| Example 74 | 93.0% | 89.1% | 6.0% | 8.5% | 85.5% |

TABLE 13-2-continued

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 75 | 93.5% | 89.7% | 6.1% | 8.7% | 84.4% |
| Example 76 | 93.3% | 89.1% | 6.3% | 8.3% | 85.3% |
| Example 77 | 93.0% | 89.0% | 6.2% | 8.8% | 85.7% |

It can be seen from the performance test results of Examples 27, and 68 to 77 that, in a case also satisfying that about 70% of the SiO$_x$ particles each was surrounded by 8 to 14 graphite particles, about 0<I$_2$/I$_1$≤about 1, and about 0.3≤Dn10/Dv50≤about 0.6, coating the silicon oxide with a polymer layer containing carbon nanotubes may further improve cycle performance and/or rate performance and deformation resistance capability of the lithium-ion battery.

14. The negative electrode active materials in Examples 78 to 86 were prepared in the following method:

(1) obtaining the silicon-based negative electrode active material of Example 78 to 86 by further coating the silicon-based negative electrode active material in Example 45 with a polymer layer containing carbon nanotubes, where the coating methods in Examples 78 to 86 were the same as the coating methods in Examples 20 to 25; and (2) preparing the negative electrodes in Examples 78 to 86 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 14-1 shows compositions of the silicon-based negative electrode active materials in Examples 45 and 78 to 86.

TABLE 14-1

| Number | Type of CNT | CNT content (wt %) | Type of polymer | Polymer content (wt %) |
|---|---|---|---|---|
| Example 45 | — | — | — | — |
| Example 78 | SCNT | 0.10 | CMC-Na | 0.15 |
| Example 79 | MCNT | 0.10 | CMC-Na | 0.15 |
| Example 80 | SCNT:MCNT = 1:1 | 0.10 | CMC-Na | 0.15 |
| Example 81 | SCNT | 0.01 | CMC-Na | 0.15 |
| Example 82 | SCNT | 0.10 | PVP | 0.15 |
| Example 83 | SCNT | 0.10 | PVDF | 0.15 |
| Example 84 | SCNT | 0.10 | PAANa | 0.15 |
| Example 85 | SCNT | 0.10 | CMC-Na | 0.4 |
| Example 86 | SCNT | 0.10 | CMC-Na | 0.025 |

"—" indicates that the substance is not added.

Table 14-2 shows performance test results of lithium-ion batteries prepared by using the negative electrodes in Examples 45, and 78 to 86.

TABLE 14-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 45 | 93.6% | 90.1% | 5.8% | 6.4% | 82.1% |
| Example 78 | 95.5% | 92.4% | 5.6% | 8.0% | 84.6% |
| Example 79 | 94.6% | 91.4% | 5.7% | 8.2% | 84.3% |
| Example 80 | 95.1% | 92.2% | 5.7% | 8.4% | 83.1% |
| Example 81 | 95.1% | 90.7% | 6.3% | 8.7% | 85.2% |
| Example 82 | 94.8% | 91.2% | 5.9% | 8.6% | 84.0% |
| Example 83 | 94.5% | 90.6% | 6.1% | 8.4% | 85.2% |
| Example 84 | 95.0% | 90.9% | 6.0% | 8.5% | 84.0% |
| Example 85 | 94.6% | 90.6% | 6.4% | 8.2% | 82.1% |
| Example 86 | 94.4% | 90.5% | 6.1% | 8.5% | 85.4% |

It can be seen from the test results of Examples 45, and 78 to 86 that, in a case also satisfying that about 70% of the SiO$_x$ particles each was surrounded by 8 to 14 graphite particles, and about 0.3≤Dn10/Dv50≤about 0.6, coating the silicon oxide having an oxide MeO$_y$ layer on the surface with a polymer layer containing carbon nanotubes may further improve cycle performance and/or rate performance of the lithium-ion battery, and cause no significant change in the deformation rate of the battery.

15. The negative electrode active materials in Examples 87 to 94 were prepared in the following method:

(1) obtaining the silicon-based negative electrode active material in Examples 87 to 94 by further coating the silicon-based negative electrode active material in Example 67 with a polymer layer containing carbon nanotubes, where the coating methods in Examples 87 to 94 were the same as the coating methods in Examples 20 to 25; and (2) preparing the negative electrodes in Examples 87 to 94 in the above method, where a percentage of the silicon-based particles each surrounded by 8 to 14 graphite particles in a total quantity of silicon-based particles was 70%, the average sphericities of the silicon-based particles and the graphite particles were about 0.92 and about 0.68 respectively, and the graphite particles were the same as the graphite particles in Table 2-2.

Table 15-1 shows compositions of the silicon-based negative electrode active materials in Examples 67, and 87 to 94.

TABLE 15-1

| Number | Type of CNT | CNT content (wt %) | Type of polymer | Polymer content (wt %) |
|---|---|---|---|---|
| Example 67 | — | — | — | — |
| Example 87 | SCNT | 0.10 | CMC-Na | 0.15 |
| Example 88 | MCNT | 0.10 | CMC-Na | 0.15 |
| Example 89 | SCNT:MCNT = 1:1 | 0.10 | CMC-Na | 0.15 |
| Example 90 | SCNT | 0.10 | PVP | 0.15 |
| Example 91 | SCNT | 0.10 | PVDF | 0.15 |

TABLE 15-1-continued

| Number | Type of CNT | CNT content (wt %) | Type of polymer | Polymer content (wt %) |
|---|---|---|---|---|
| Example 92 | SCNT | 0.10 | PAANa | 0.15 |
| Example 93 | SCNT | 0.10 | CMC-Na | 0.4 |
| Example 94 | SCNT | 0.10 | CMC-Na | 0.025 |

"—" indicates that the substance is not added.

Table 15-2 shows performance test results of lithium-ion batteries prepared by using the negative electrodes in Examples 67, and 87 to 94.

TABLE 15-2

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 67 | 94.6% | 91.1% | 5.8% | 6.4% | 82.1% |
| Example 87 | 96.5% | 93.3% | 5.5% | 8.1% | 84.6% |
| Example 88 | 95.5% | 91.9% | 5.6% | 8.5% | 84.3% |
| Example 89 | 96.2% | 91.8% | 5.7% | 8.6% | 84.1% |
| Example 90 | 95.7% | 91.2% | 5.8% | 8.7% | 84.1% |
| Example 91 | 95.4% | 91.1% | 6.0% | 8.5% | 85.5% |
| Example 92 | 96.1% | 91.7% | 6.1% | 8.7% | 84.4% |
| Example 93 | 95.7% | 91.1% | 6.5% | 8.3% | 82.3% |
| Example 94 | 95.3% | 91.0% | 6.2% | 8.8% | 85.7% |

It can be seen from the performance test results of Examples 67, and 87 to 94 that, in a case also satisfying that about 70% of the $SiO_x$ particles each was surrounded by 8 to 14 graphite particles, about $0<I_2/I_1\leq$about 1, and about $0.3\leq Dn10/Dv50\leq$about 0.6, coating the silicon oxide having an oxide $MeO_y$ layer on the surface with a polymer layer containing carbon nanotubes may further improve cycle performance and/or rate performance of the lithium-ion battery, and cause no significant change in the deformation rate of the battery.

16. A commercially available silicon oxide $SiO_x$ (0.5<x<1.5, Dv50=about 5.3 μm) and graphite particles (Dv50=about 14 μm) were selected as negative electrode active materials, and the negative electrodes in Examples 95 to 98 and Comparative Examples 9 to 11 were prepared according to the above method.

Table 16-1 shows compositions of the negative electrodes in Examples 95 and 96 and Comparative Example 9, where the average sphericity of the graphite particles in Examples 1, 95, and 96, and Comparative Example 9 was about 0.68. The graphite particles were the same as the graphite particles in Table 2-2.

TABLE 16-1

| Number | Average sphericity of $SiO_x$ particles | Quantity of graphite particles surrounding a $SiO_x$ particle (N) | Percentage of $SiO_x$ particles each satisfying that a quantity of surrounding graphite particles is N in a total quantity of $SiO_x$ particles | Specific surface area ($m^2 \cdot g^{-1}$) | Gram capacity * ($mAh \cdot g^{-1}$) | Initial efficiency |
|---|---|---|---|---|---|---|
| Example 1 | 0.92 | 8-14 | 70% | 1.28 | 1682 | 69.4% |
| Example 95 | 0.89 | 8-14 | 70% | 1.31 | 1672 | 68.7% |
| Example 96 | 0.85 | 8-14 | 70% | 1.28 | 1687 | 68.9% |
| Comparative Example 9 | 0.76 | 8-14 | 70% | 1.35 | 1684 | 69.2% |

Table 16-2 shows compositions of the negative electrodes in Examples 1, 97, and 98, and Comparative Examples 9 and 10, where the average sphericity of the $SiO_x$ particles was about 0.92, and Dv50 was about 5.3 μm.

TABLE 16-2

| Number | Average sphericity of graphite particles | Quantity of graphite particles surrounding a $SiO_x$ particle (N) | Percentage of $SiO_x$ particles each satisfying that a quantity of surrounding graphite particles is N in a total quantity of $SiO_x$ particles | Specific surface area ($m^2 \cdot g^{-1}$) | Graphite gram capacity * ($mAh \cdot g^{-1}$) | Graphite initial efficiency |
|---|---|---|---|---|---|---|
| Example 1 | 0.68 | 8-14 | 70% | 1.06 | 355 | 92.6% |
| Example 97 | 0.62 | 8-14 | 70% | 1.07 | 355 | 92.5% |
| Example 98 | 0.74 | 8-14 | 70% | 1.01 | 355 | 92.6% |
| Comparative Example 10 | 0.84 | 8-14 | 70% | 1.08 | 355 | 92.7% |
| Comparative Example 11 | 0.55 | 8-14 | 70% | 1.1 | 355 | 92.3% |

Table 16-3 and Table 16-4 show performance test results of lithium-ion batteries prepared by using the negative electrodes in Examples 1, and 95 to 98 and Comparative Examples 9 to 11.

TABLE 16-3

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 95 | 91.1% | 87.2% | 7.2% | 8.3% | 86.1% |
| Example 96 | 89.6% | 86.4% | 8.2% | 9.2% | 85.1% |
| Comparative Example 9 | 82.7% | 80.4% | 9.5% | 10.8% | 83.6% |

TABLE 16-4

| Number | Capacity retention rate after 400 cycles at 25° C. | Capacity retention rate after 200 cycles at 45° C. | Deformation rate after 400 cycles at 25° C. | Deformation rate after 200 cycles at 45° C. | Rate performance (2 C) |
|---|---|---|---|---|---|
| Example 1 | 92.5% | 89.5% | 6.2% | 7.4% | 86.7% |
| Example 97 | 91.1% | 87.2% | 6.8% | 8.3% | 84.1% |
| Example 98 | 89.6% | 86.4% | 8.2% | 9.2% | 87.1% |
| Comparative Example 10 | 82.7% | 80.4% | 9.5% | 10.8% | 87.6% |
| Comparative Example 11 | 83.9% | 81.7% | 9.2% | 10.5% | 87.2% |

From the comparison between Examples 1, 95, 96 and Comparative Example 9, and the comparison between Examples 1, 97, 98, and Comparative Examples 10 and 11, it can be seen that, in a case also satisfying that about 70% of the $SiO_x$ particles each was surrounded by 8 to 14 graphite particles, when a difference between the average sphericities of the silicon-based particles and the graphite particles was in a range of about 0.1 to 0.3, cycle performance, deformation resistance capability, and rate performance of the lithium-ion battery prepared by using the particles were significantly better than those of the lithium-ion battery when the difference was beyond the range of about 0.1 to 0.3.

This is because when the difference between the average sphericities of the silicon-based particles and the graphite particles was in a range of about 0.1 to 0.3, the stress generated by swelling of the $SiO_x$ particles during lithiation can be evenly distributed, and the particle displacement of the $SiO_x$ particles during swelling and contraction can be reduced, alleviating the generation of surface cracks of the $SiO_x$ particles, and reducing the SEI accumulation and rate of corrosion on surfaces of $SiO_x$ particles.

References to "some embodiments", "some of the embodiments", "an embodiment", "another example", "examples", "specific examples" or "some examples" in the specification mean the inclusion of specific features, structures, materials, or characteristics described in the embodiment or example in at least one embodiment or example of this application. Therefore, descriptions in various places throughout the specification, such as "in some embodiments", "in the embodiments", "in an embodiment", "in another example", "in an example", "in a specific example" or "examples", do not necessarily refer to the same embodiment or example in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. A negative electrode, comprising: silicon-based particles and graphite particles, wherein each silicon-based particle is surrounded by N graphite particles within a vertical distance of 0 to 6 μm from respective edges of each silicon-based particle; and wherein, based on a total quantity of the silicon-based particles, 6≤N≤17 for more than 50% of the silicon-based particles;
   wherein a particle size distribution of the silicon-based particles satisfies: 0.3≤Dn10/Dv50≤0.6.

2. The negative electrode according to claim 1, wherein in an X-ray diffraction pattern, a highest intensity value of the silicon-based particles is $I_2$ when 2θ is in a range of 28.0° to 29.0°, and the highest intensity value is $I_1$ when 2θ is in a range of 20.5° to 21.5°, wherein 0<$I_2/I_1$<1.

3. The negative electrode according to claim 1, wherein the each silicon-based particle comprises a silicon composite matrix and an oxide $MeO_y$ layer, and at least a part of the silicon composite matrix is coated with the oxide $MeO_y$ layer, wherein Me comprises at least one of Al, Si, Ti, Mn, V, Cr, Co, or Zr, wherein y is 0.5 to 3; and wherein the oxide $MeO_y$ layer comprises a carbon material.

4. The negative electrode according to claim 1, wherein each silicon-based particle comprises a silicon composite matrix and a polymer layer, at least a part of the silicon composite matrix is coated with the polymer layer, and the polymer layer comprises a carbon material.

5. The negative electrode according to claim 2, wherein each silicon-based particle comprises a silicon composite matrix and an oxide $MeO_y$ layer, and at least a part of the silicon composite matrix is coated with the oxide $MeO_y$ layer, wherein Me comprises at least one of Al, Si, Ti, Mn, V, Cr, Co, or Zr, wherein y is 0.5 to 3; and wherein the oxide $MeO_y$ layer comprises a carbon material.

6. The negative electrode according to claim 3, wherein each silicon-based particle further comprises a polymer layer, at least a part of the oxide $MeO_y$ layer is coated with the polymer layer, and the polymer layer comprises a carbon material.

7. The negative electrode according to claim 3, wherein the silicon composite matrix comprises $SiO_x$, with 0.6<x<1.5.

8. The negative electrode according to claim 3, wherein the silicon composite matrix comprises nanocrystalline Si grains, SiO, $SiO_2$, and or any combination thereof.

9. The negative electrode according to claim 8, wherein the nanocrystalline Si grains are less than or equal to 100 nm in size.

10. The negative electrode according to claim 3, wherein the oxide $MeO_y$ layer is 0.5 nm to 1000 nm in thickness.

11. The negative electrode according to claim 3, wherein based on a total weight of the silicon-based particles, a percentage by weight of the Me element is 0.005 wt % to 1 wt %.

12. The negative electrode according to claim 4, wherein the polymer layer comprises polyvinylidene fluoride and its derivatives, carboxymethyl cellulose and its derivatives, polyvinylpyrrolidone and its derivatives, polyacrylic acid and its derivatives, polystyrene-butadiene rubber, polyacrylamide, polyimide, polyamideimide, or any combination thereof.

13. The negative electrode according to claim 4, wherein based on a total weight of the silicon-based particles, a percentage by weight of the polymer layer is 0.05 to 5 wt %.

14. The negative electrode according to claim 4, wherein the polymer layer is 1 nm to 100 nm in thickness.

15. The negative electrode according to claim 1, wherein each silicon-based particle further comprises a polymer layer and an oxide $MeO_y$ layer, wherein Me comprises at least one of Al, Si, Ti, Mn, V, Cr, Co, or Zr, wherein y is 0.5 to 3; at least a part of the oxide MeOy layer is coated with the polymer layer, and the polymer layer comprises a carbon material.

16. The negative electrode according to claim 1, wherein an average sphericity of the graphite particles is A, an average sphericity of the silicon-based particles is B, and $0 \leq B-A \leq 0.3$.

17. The negative electrode according to claim 1, wherein the particle size Dv50 of the silicon-based particles is 0.01 to 50 μm.

18. The negative electrode according to claim 1, wherein a specific surface area of the silicon-based particles is 1 to 50 m²/g.

19. The negative electrode according to claim 1, wherein the average sphericity of the silicon-based particles is 0.8 to 1.0.

20. The negative electrode according to claim 19, wherein a quantity of silicon-based particles with a sphericity less than 0.8 is less than or equal to 10% of the total quantity of the silicon-based particles.

21. The negative electrode according to claim 1, wherein the average sphericity of the graphite particles is 0.5 to 0.8.

22. The negative electrode according to claim 1, wherein a quantity of graphite particles with a sphericity of 0.5 to 0.8 is greater than or equal to 95% of a total quantity of the graphite particles.

23. The negative electrode according to claim 1, wherein the graphite particles in Raman spectroscopy analysis exhibit a scattering peak $I_{1330}$ at 1330 cm⁻¹, and a scattering peak $I_{1580}$ at 1580 cm⁻¹, and a ratio of $I_{1330}/I_{1580}$ satisfies $0.7 < I_{1330}/I_{1580} < 2.0$.

24. The negative electrode according to claim 1, wherein a particle size Dv50 of the graphite particles is 0.01 to 80 μm.

25. The negative electrode according to claim 1, wherein a specific surface area of the graphite particles is less than or equal to 30 m²/g.

26. The negative electrode according to claim 1, wherein an OI value of the graphite particles is 1 to 30.

27. An electrochemical apparatus, comprising a negative electrode, the negative electrode comprises silicon-based particles and graphite particles, wherein a quantity of graphite particles present within a vertical distance of 0 to 6 μm to respective edges of each silicon-based particle is N, and based on a total quantity of the silicon-based particles, more than 50% of the silicon-based particles satisfy: $6 \leq N \leq 17$;
wherein a particle size distribution of the silicon-based particles satisfies: $0.3 \leq Dn10/Dv50 \leq 0.6$.

28. An electronic apparatus, comprising the electrochemical apparatus according to claim 27.

29. A negative electrode, comprising: silicon-based particles and graphite particles, wherein each silicon-based particle is surrounded by N graphite particles within a vertical distance of 0 to 6 μm from respective edges of each silicon-based particle; and wherein, based on a total quantity of the silicon-based particles, $6 \leq N \leq 17$ for more than 50% of the silicon-based particles;
wherein each silicon-based particle comprises a silicon composite matrix, an oxide $MeO_y$ layer, and a polymer layer;
wherein at least a part of the silicon composite matrix is coated with the oxide $MeO_y$ layer, and at least a part of the oxide $MeO_y$ layer is coated with the polymer layer;
wherein Me comprises at least one of Al, Si, Ti, Mn, V, Cr, Co, or Zr, and y is 0.5 to 3; the oxide $MeO_y$ layer comprises a carbon material; and the polymer layer comprises a carbon material.

30. A negative electrode, comprising: silicon-based particles and graphite particles, wherein each silicon-based particle is surrounded by N graphite particles within a vertical distance of 0 to 6 μm from respective edges of each silicon-based particle; and wherein, based on a total quantity of the silicon-based particles, $6 \leq N \leq 17$ for more than 50% of the silicon-based particles,
wherein each silicon-based particle comprises a silicon composite matrix and an oxide $MeO_y$ layer, and at least a part of the silicon composite matrix is coated with the oxide $MeO_y$ layer, wherein Me comprises at least one of Al, Si, Ti, Mn, V, Cr, Co, or Zr, wherein y is 0.5 to 3; and
wherein the oxide MeOy layer comprises a carbon material, wherein the silicon composite matrix comprises nanocrystalline Si grains, SiO, $SiO_2$, or any combination thereof, and
wherein the nanocrystalline Si grains are less than or equal to 100 nm in size.

* * * * *